United States Patent
Mori et al.

(10) Patent No.: US 11,959,000 B2
(45) Date of Patent: Apr. 16, 2024

(54) PHOTON UP-CONVERSION FILM AND METHOD OF PRODUCING THE FILM

(71) Applicants: WAKAYAMA PREFECTURE, Wakayama (JP); NITTO DENKO CORPORATION, Ibaraki (JP)

(72) Inventors: Takeshi Mori, Wakayama (JP); Tomohiro Mori, Wakayama (JP); Akane Saito, Wakayama (JP); Tsuyoshi Masuda, Wakayama (JP); Hitoshi Saomoto, Wakayama (JP); Mami Kawaguchi, Ibaraki (JP); Minoru Miyatake, Ibaraki (JP); Shoichi Matsuda, Ibaraki (JP); Masato Katsuda, Ibaraki (JP)

(73) Assignees: WAKAYAMA PREFECTURE, Wakayama (JP); NITTO DENKO CORPORATION, Ibaraki (JP)

( * ) Notice: Subject to any disclaimer, the term of this patent is extended or adjusted under 35 U.S.C. 154(b) by 0 days.

(21) Appl. No.: 18/018,177

(22) PCT Filed: Jun. 15, 2022

(86) PCT No.: PCT/JP2022/024021
§ 371 (c)(1),
(2) Date: Jan. 26, 2023

(87) PCT Pub. No.: WO2023/074040
PCT Pub. Date: May 4, 2023

(65) Prior Publication Data
US 2024/0059960 A1 Feb. 22, 2024

(30) Foreign Application Priority Data
Oct. 28, 2021 (JP) .................................. 2021-176122

(51) Int. Cl.
*C09K 11/06* (2006.01)
*C08J 5/18* (2006.01)
(Continued)

(52) U.S. Cl.
CPC ................. *C09K 11/06* (2013.01); *C08J 5/18* (2013.01); *C08J 9/0023* (2013.01); *C08J 9/0033* (2013.01);
(Continued)

(58) Field of Classification Search
CPC . C09K 11/02; C09K 11/06; C09K 2211/1007; C09K 2211/1011;
(Continued)

(56) References Cited

U.S. PATENT DOCUMENTS 7,364,673 B2    4/2008   Arsenault et al.
7,616,376 B2   11/2009   Arsenault et al.
(Continued)

FOREIGN PATENT DOCUMENTS

JP       5491408 B2      5/2014
JP     2018-35025 A      3/2018
(Continued)

OTHER PUBLICATIONS

Amemori et al., "Near-Infrared-to-Visible Photon Upconversion Sensitized by a Metal Complex with Spin-Forbidden yet Strong $S_0$-$T_1$ Absorption", Journal of the American Chemical Society, 2016, 138, pp. 8702-8705 (4 pages).
(Continued)

*Primary Examiner* — C Melissa Koslow
(74) *Attorney, Agent, or Firm* — WHDA, LLP

(57) ABSTRACT

Provided are a photon up-conversion film, which is capable, of high-efficiency up-conversion even in air and even when low-intensity light is used, and a simple method of producing the film. The photon up-conversion film according to one
(Continued)

embodiment of the present invention includes: a matrix including a resin; and a pore portion, wherein the photon up-conversion film includes at least a sensitizing component capable of absorbing light in a first wavelength region $\lambda 1$, and a light-emitting component capable of radiating light in a second wavelength region $\lambda 2$ including wavelengths shorter than those of the first wavelength region $\lambda 1$, and wherein the sensitizing component and the light-emitting component are present at an interface between the matrix and the pore portion.

15 Claims, 3 Drawing Sheets

(51) Int. Cl.
| | |
|---|---|
| C08J 9/00 | (2006.01) |
| C08J 9/28 | (2006.01) |
| C08K 5/00 | (2006.01) |
| C08K 5/01 | (2006.01) |
| C08K 5/06 | (2006.01) |
| C08K 5/092 | (2006.01) |
| C08K 5/45 | (2006.01) |
| C09K 11/02 | (2006.01) |

(52) U.S. Cl.
CPC ............ *C08J 9/0052* (2013.01); *C08J 9/283* (2013.01); *C08K 5/0091* (2013.01); *C08K 5/01* (2013.01); *C08K 5/06* (2013.01); *C08K 5/092* (2013.01); *C08K 5/45* (2013.01); *C09K 11/02* (2013.01); *C08J 2201/0504* (2013.01); *C08J 2301/28* (2013.01); *C08J 2325/06* (2013.01); *C08J 2325/18* (2013.01); *C08J 2329/04* (2013.01); *C08J 2333/12* (2013.01); *C09K 2211/1007* (2013.01); *C09K 2211/1011* (2013.01); *C09K 2211/1018* (2013.01)

(58) Field of Classification Search
CPC ..... C09K 2211/1016; C08J 5/18; C08J 9/283; C08J 201/0504; C08J 2205/04; C08J 2301/28; C08J 2329/04; C08J 2325/06; C08J 2325/18; C08J 2333/12
See application file for complete search history.

(56) References Cited

U.S. PATENT DOCUMENTS

| | | | |
|---|---|---|---|
| 7,826,131 | B2 | 11/2010 | Arsenault et al. |
| 8,400,707 | B2 | 3/2013 | Miteva et al. |
| 10,004,683 | B2 | 6/2018 | Memarzadeh |
| 10,875,983 | B2 | 12/2020 | Mori et al. |
| 2004/0131799 | A1 | 7/2004 | Arsenault et al. |
| 2008/0224103 | A1 | 9/2008 | Arsenault et al. |
| 2009/0034051 | A1 | 2/2009 | Arsenault et al. |
| 2011/0013263 | A1 | 1/2011 | Miteva et al. |
| 2016/0367576 | A1 | 12/2016 | Memarzadeh |

FOREIGN PATENT DOCUMENTS

| | | |
|---|---|---|
| WO | 2016/204301 A1 | 12/2016 |
| WO | 2019/087813 A1 | 5/2019 |

OTHER PUBLICATIONS

Svagan et al., "Photon Energy Upconverting Nanopaper: A Bioinspired Oxygen Protection Strategy", ACS Nano, 2014, vol. 8, No. 8, pp. 8198-8207 (10 pages).
Vadrucci et al., "Nanodroplet-Containing Polymers for Efficient Low-Power Light Upconversion", Advanced Materials, 2017, vol. 29, 1702992 (8 pages).
International Search Report in Japanese dated Sep. 6, 2022, issued in counterpart International Application No. PCT/JP2022/024021 (3 pages).
English translation of International Search Report dated Sep. 6, 2022, issued in counterpart international application No. PCT/JP2022/024021. (2 pages).

PHOTON UP-CONVERSION FILM AND METHOD OF PRODUCING THE FILM

Technical Field

The present invention relates to a photon up-conversion film and a method of producing the film.

Background Art

A photon up-conversion (hereinafter sometimes simply referred to as "up-conversion") technology by which low-energy light is converted into high-energy light has been expected to find applications in a wide variety of fields including a solar cell or photovoltaic power generation, a photocatalyst, bioimaging, and an optical instrument. A technology including utilizing triplet-triplet annihilation (TTA) caused by collision between molecules in a triplet state has been known as up-conversion emission in an organic material. In solution-based up-conversion in which a donor compound and an acceptor compound are dissolved in a solvent out of the kinds of up-conversion each utilizing the TTA, energy exchange is efficiently performed by the diffusion of a molecule of the donor compound and a molecule of the acceptor compound. Meanwhile, there is a problem in that fields in which the solution-based up-conversion can be put into practical use are limited.

In view of such circumstances as described above, the research and development of up-conversion emission in a solid state have been advanced. However, substantially no molecular diffusion occurs in the solid state, and hence there is a problem in that TTA cannot be efficiently utilized. For example, a resin film having introduced thereinto a donor compound and an acceptor compound has been investigated, but its up-conversion emission intensity is insufficient.

In addition, in a related-art up-conversion technology, the conversion of low-intensity light (e.g., sunlight) is insufficient, and conversion from near-infrared light to visible light is particularly insufficient. In addition, according to the related-art up-conversion technology, the performance of up-conversion in air is also insufficient.

Citation List

Patent Literature

[PTL 1] JP 5491408 B2

Summary of Invention

Technical Problem

The present invention has been made to solve the above mentioned problems of the related art, and a primary object of the present invention is to provide a photon up-conversion film, which is capable of high-efficiency up-conversion even in air or even when low-intensity light is used, and a simple method of producing the film.

Solution to Problem

According to one embodiment of the present invention, there is provided a photon up-conversion film, including: a matrix including a resin; and a pore portion, wherein the photon up-conversion film includes at least a sensitizing component capable of absorbing light in a first wavelength region $\lambda 1$, and a light-emitting component capable of radiating light in a second wavelength region $\lambda 2$ including wavelengths shorter than those of the first wavelength region $\lambda 1$, and wherein the sensitizing component and the light-emitting component are present at an interface between the matrix and the pore portion.

In one embodiment, the photon up-conversion film has a porosity of from 5.0 vol% to 60.0 vol%.

In one embodiment, the pore portion has closed cells and an open-cell structure in which a plurality of cells are continuous with each other.

In one embodiment, the resin is a water-soluble resin selected from a polystyrene sulfonic acid salt, polyethylene oxide, polyethyleneimine, a polyvinyl alcohol-based resin, and a cellulose-based resin. In another embodiment, the resin is an oil-soluble resin selected from (meth)acrylic resin and polystyrene.

In one embodiment, the photon up-conversion film includes $7.00 \times 10^{-9}$ mol to $5.00 \times 10^{-6}$ mol of the sensitizing component, and $5.00 \times 10^{-6}$ mol to $7.00 \times 10^{-5}$ mol of the light-emitting component with respect to 1 g of the resin.

In one embodiment, the first wavelength region $\lambda 1$ ranges from 510 nm to 550 nm, the second wavelength region $\lambda 2$ ranges from 400 nm to 500 nm, the sensitizing component is any one of the below-indicated compounds, and the light-emitting component is any one of the below-indicated compounds.

<Sensitizing Component>

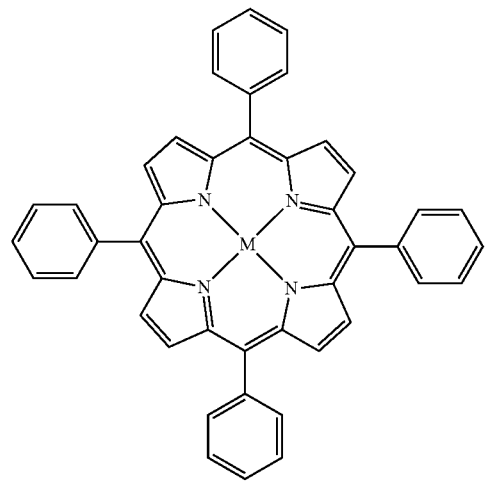

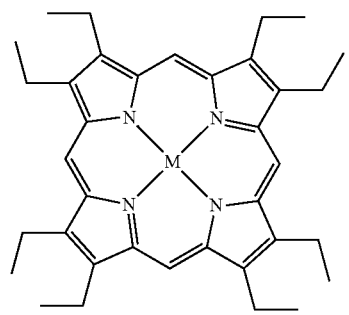

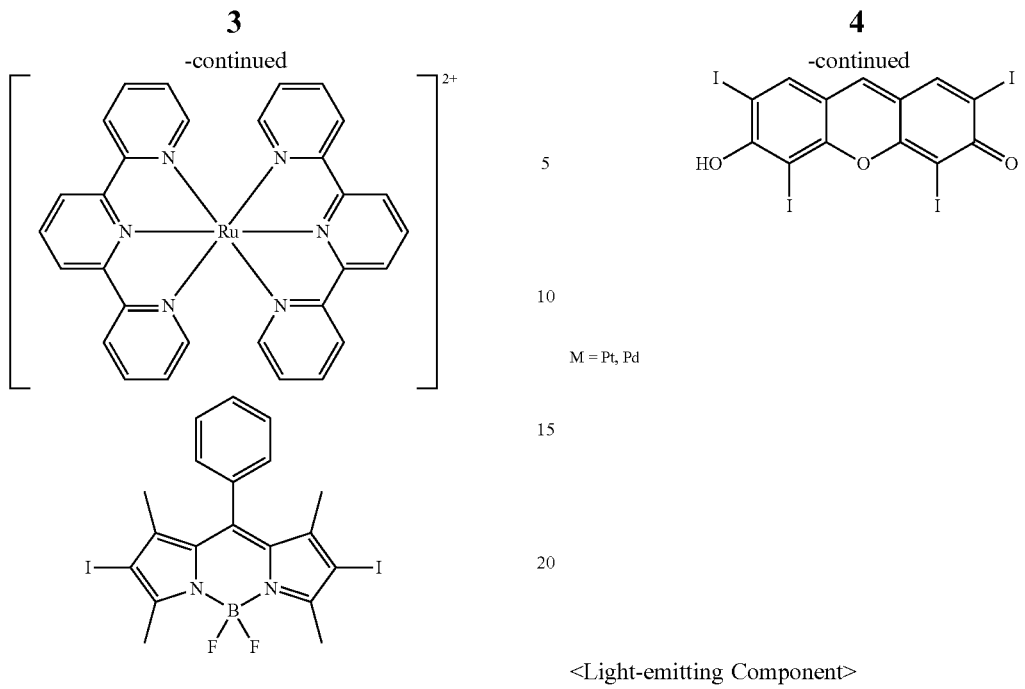
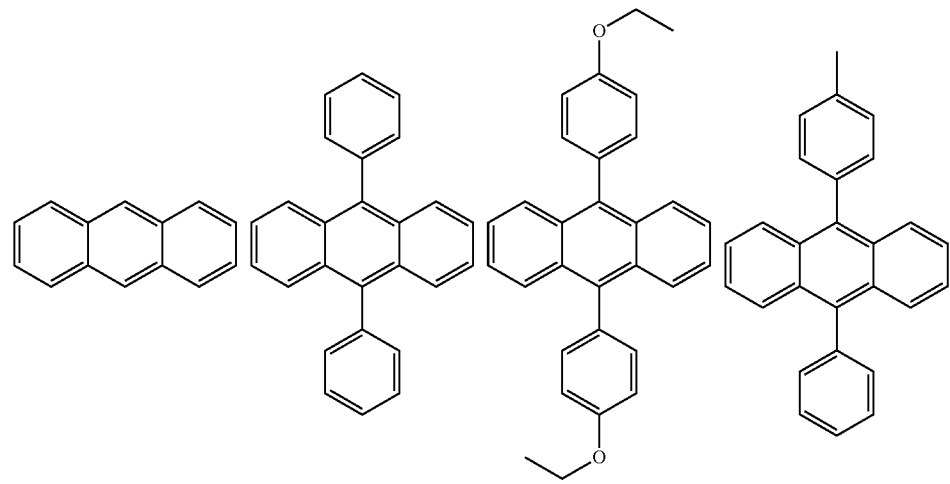
M = Pt, Pd
<Light-emitting Component>
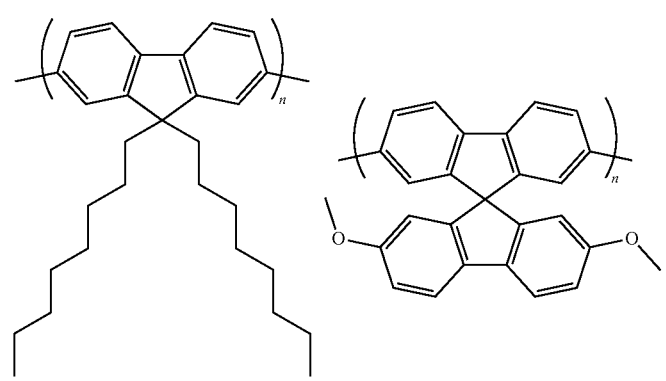

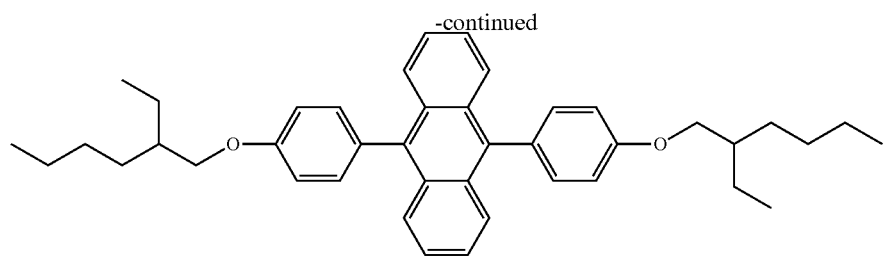
In one embodiment, the first wavelength region λ1 ranges from 610 nm to 650 nm, the second wavelength region λ2 ranges from 500 nm to 600 nm, the sensitizing component is any one of the below-indicated compounds, and the light-emitting component is any one of the below-indicated compounds.
<Sensitizing Component>
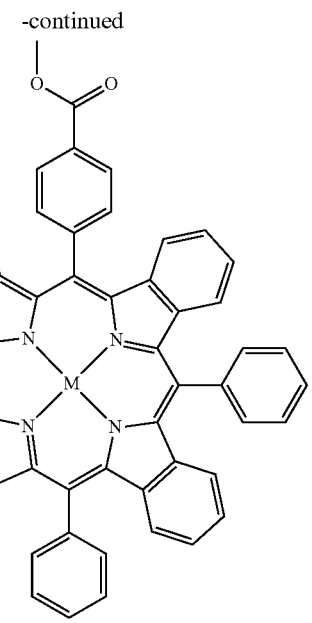
M = Pt, Pd
<Light-emitting Component>
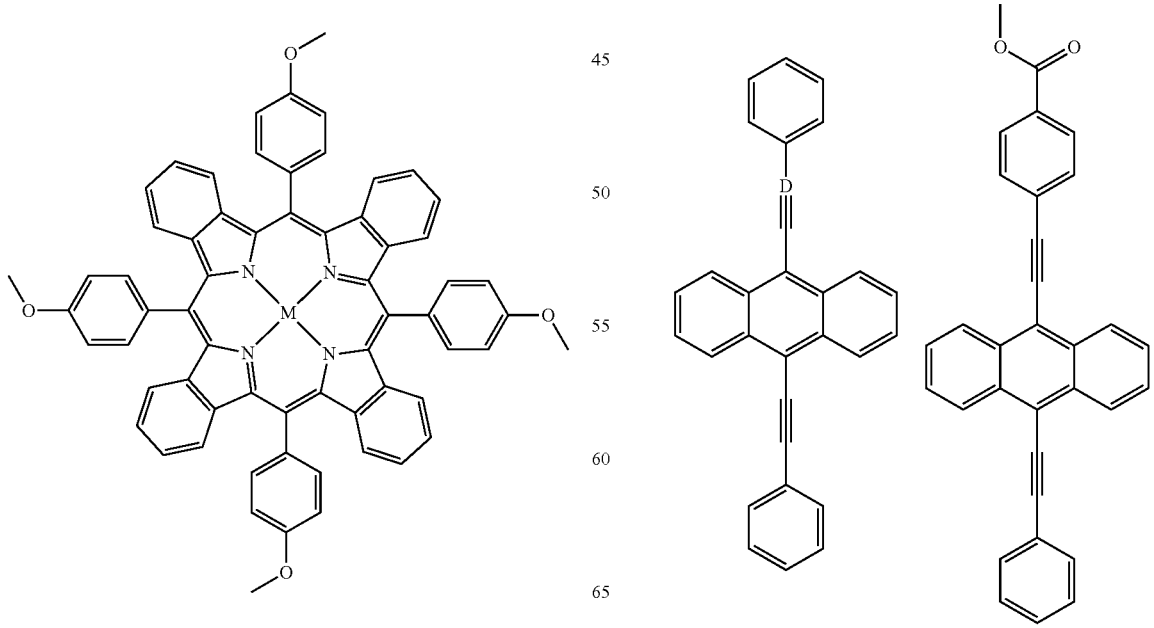

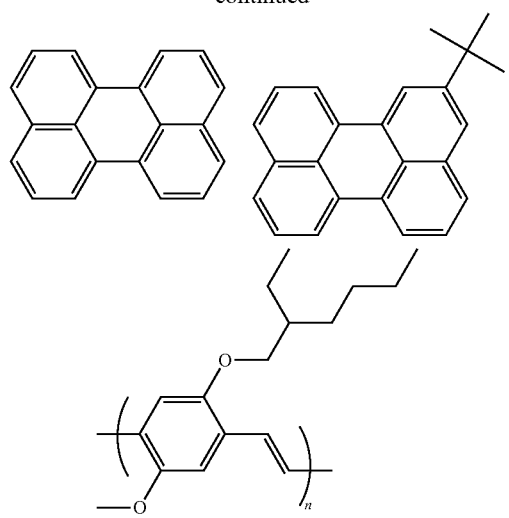
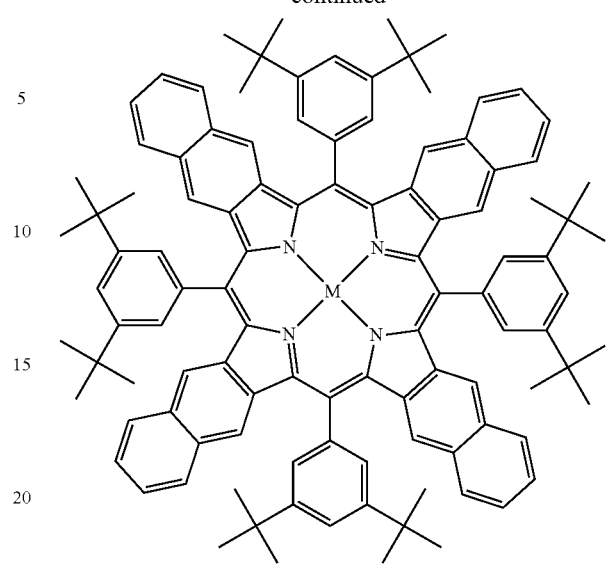
In one embodiment, the first wavelength region λ1 ranges from 700 nm to 810 nm, the second wavelength region λ2 ranges from 500 nm to 700 nm, the sensitizing component is any one of the below-indicated compounds, and the light-emitting component is any one of the below-indicated compounds.
<Sensitizing Component>
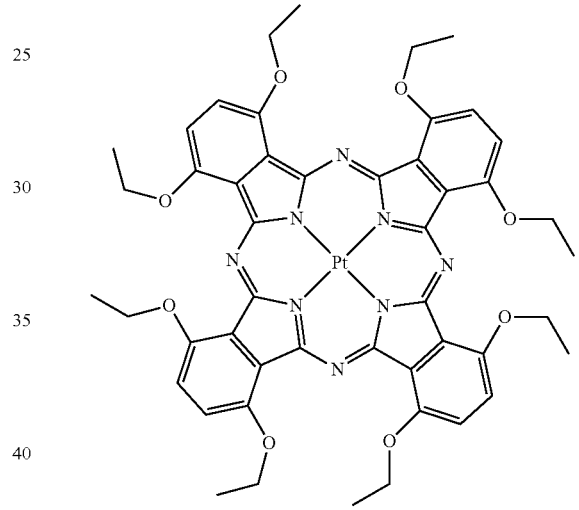
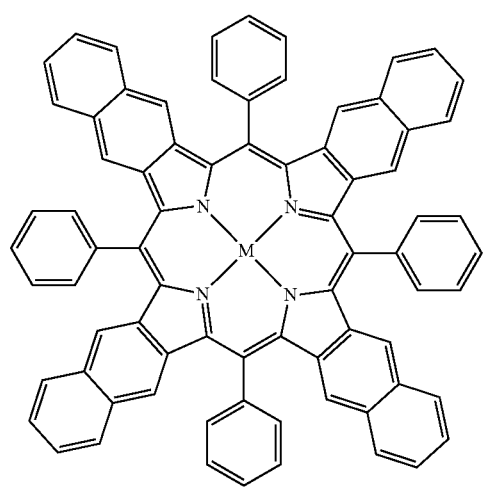
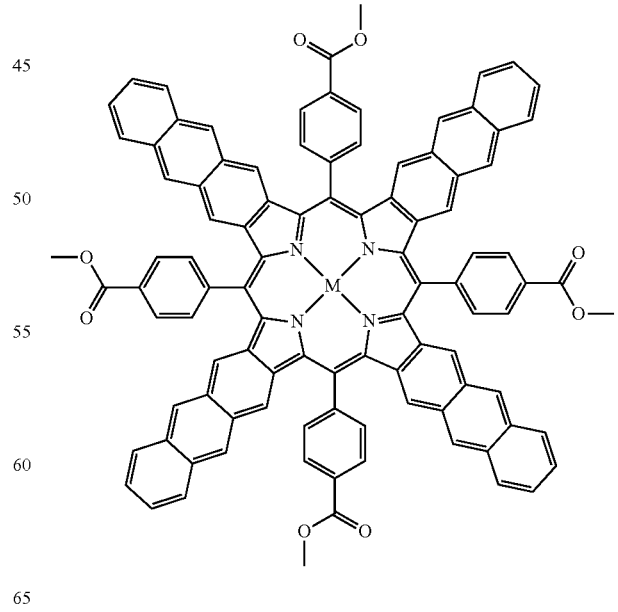

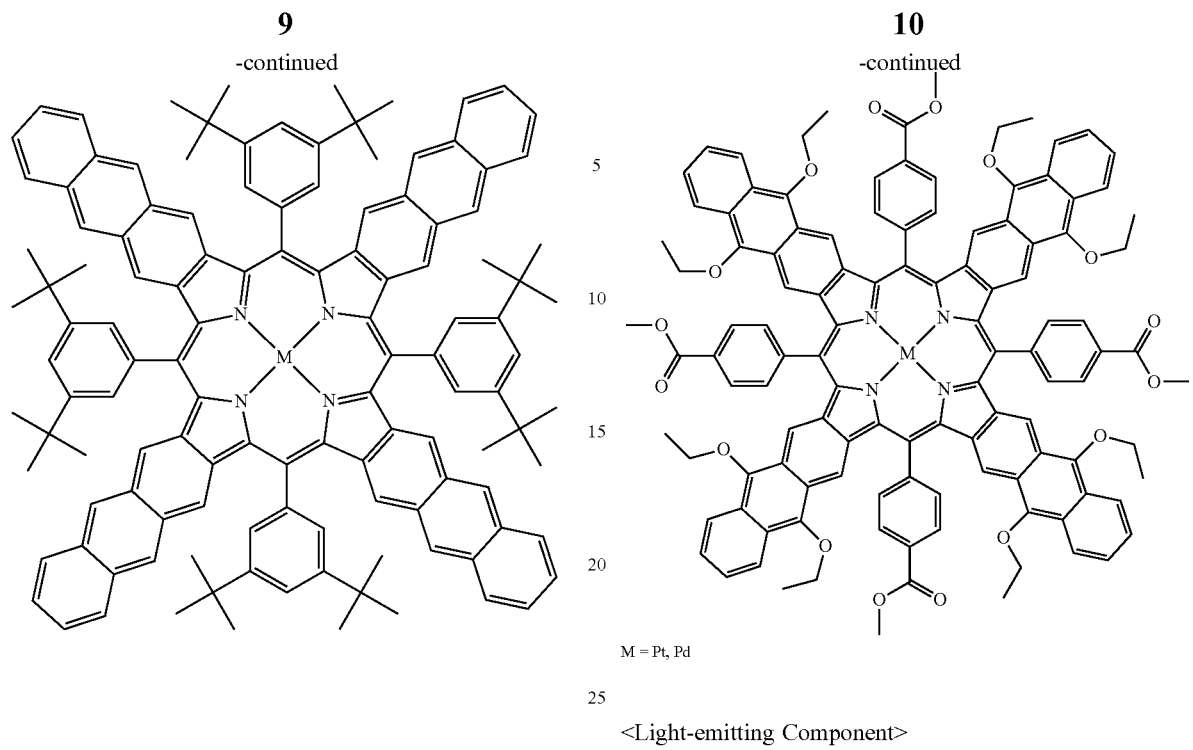
M = Pt, Pd
<Light-emitting Component>
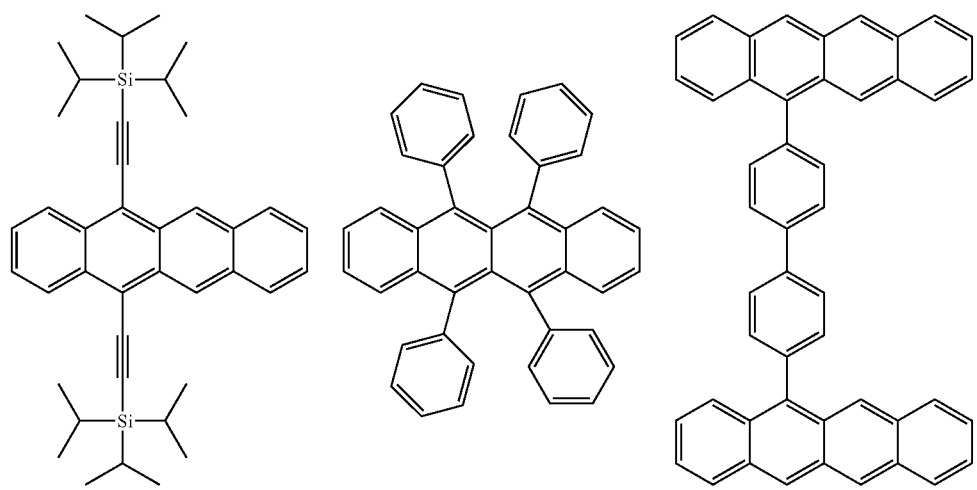

-continued
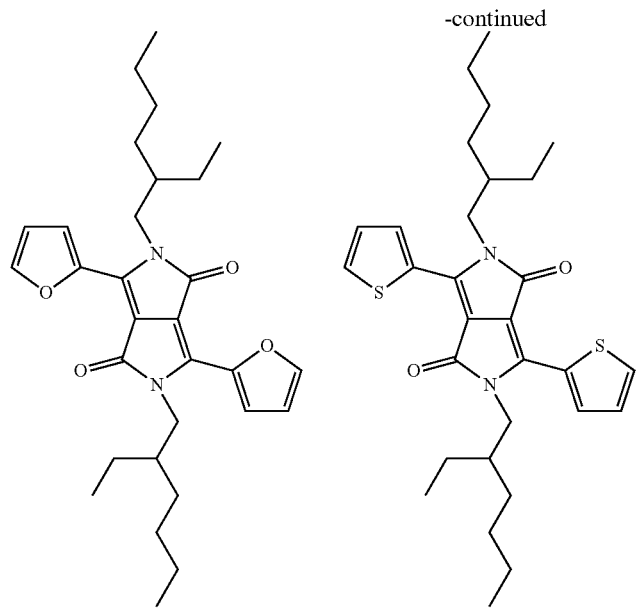
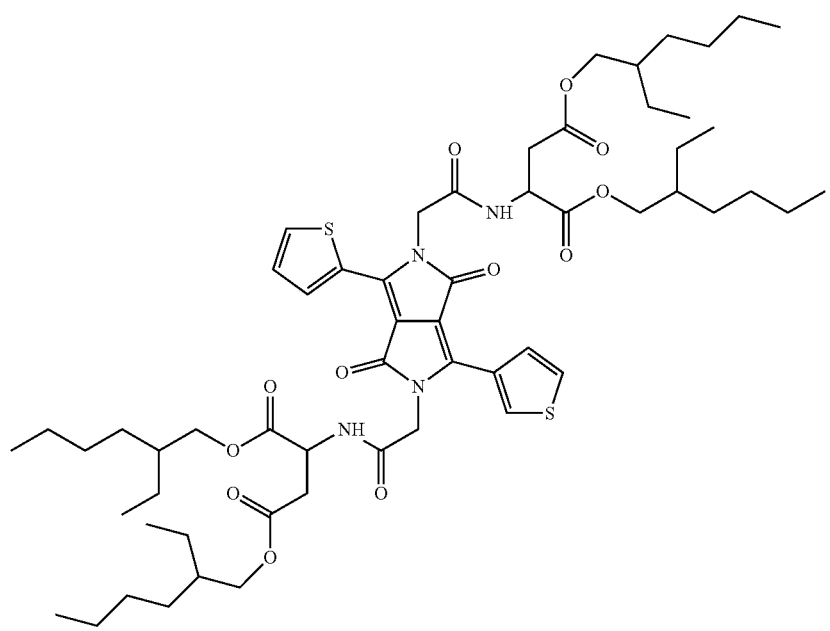
In one embodiment, the first wavelength region λ1 ranges from 700 nm to 730 nm, the second wavelength region λ2 ranges from 400 nm to 500 nm, the sensitizing component is any one of the below-indicated compounds, and the light-emitting component is any one of the below-indicated compounds.

<Sensitizing Component>

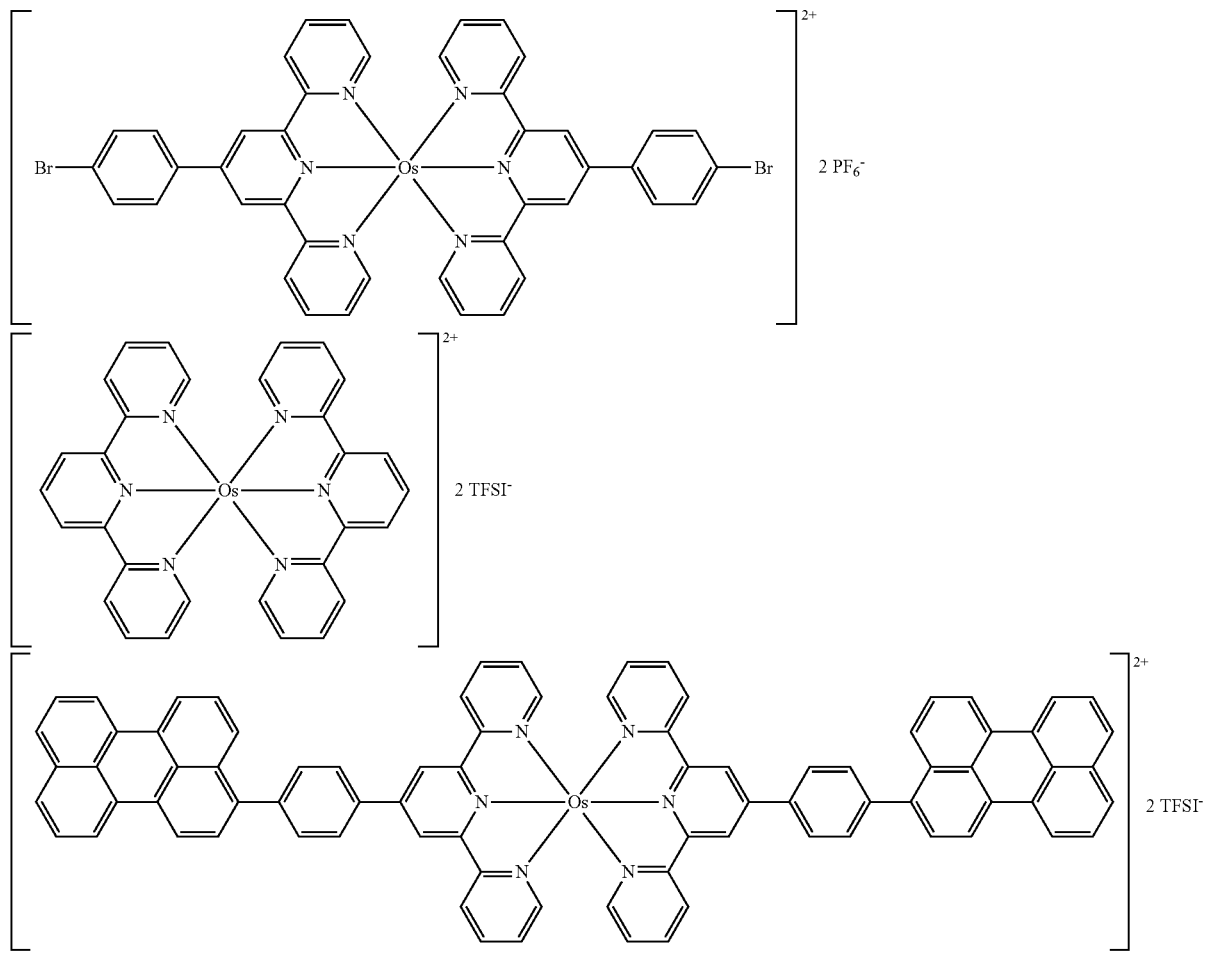

<Light-emitting Component>

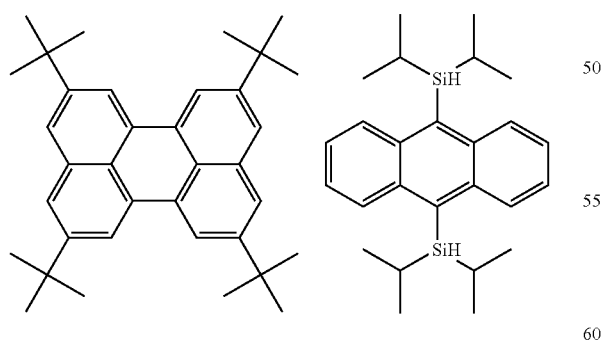

<Sensitizing Component>

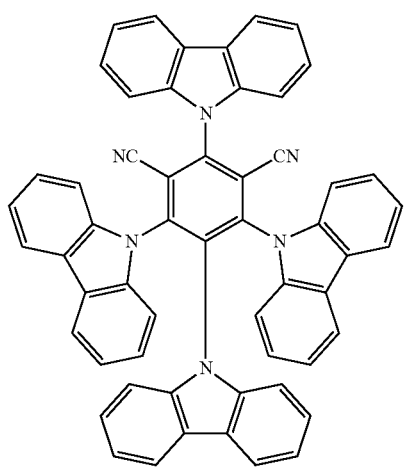

In one embodiment, the first wavelength region $\lambda 1$ ranges from 410 nm to 500 nm, the second wavelength region $\lambda 2$ ranges from 300 nm to 400 nm, the sensitizing component is any one of the below-indicated compounds, and the light-emitting component is any one of the below-indicated compounds.

-continued

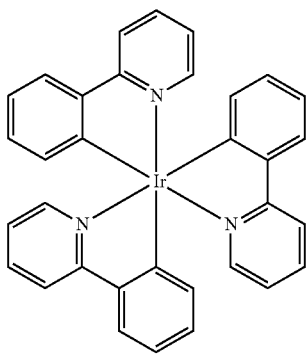

<Light-emitting Component>

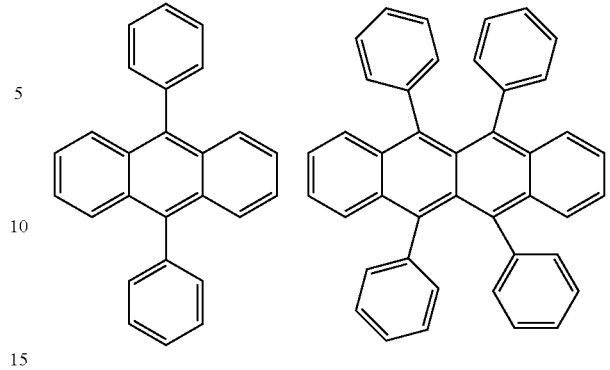

In one embodiment, the photon up-conversion film is capable of up-conversion emission at from −196° C. to 180° C.

According to other aspects of the present invention, there are provided methods of producing a photon up-conversion film. One production method out of the methods includes: preparing an oil-in-water emulsion from an aqueous solution of a water-soluble resin, and an oily solvent solution of a sensitizing component and a light-emitting component, or an oily solvent dispersion thereof; applying the oil-in-water emulsion to a substrate to form a coating film; drying the coating film; and applying an external force and/or heat to the dried coating film to form a film, which includes a matrix including the water-soluble resin and a pore portion, and in which the sensitizing component and the light-emitting component are present at an interface between the matrix and the pore portion.

Another production method includes: preparing a water-in-oil emulsion from an oily solvent solution of an oil-soluble resin, and an aqueous solution of a sensitizing component and a light-emitting component, or an aqueous dispersion thereof; applying the water-in-oil emulsion to a substrate to form a coating film; drying the coating film; and forming, through the drying, a film, which includes a matrix including the oil-soluble resin and a pore portion, and in which the sensitizing component and the light-emitting component are present at an interface between the matrix and the pore portion.

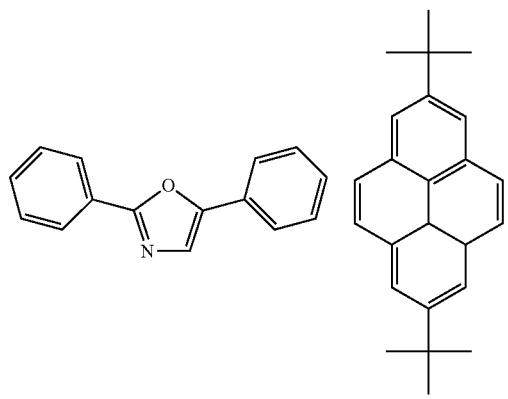

Advantageous Effects of Invention

According to the embodiment of the present invention, the photon up-conversion film is formed from the porous film including the matrix and the pore portion, and the sensitizing component and the light-emitting component are caused to be present at the interface between the matrix and the pore portion. Accordingly, there can be achieved the photon up-conversion film, which is capable of high-efficiency up-conversion even in air or even when low-intensity light is used.

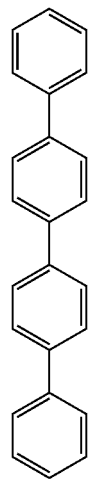

In one embodiment, the sensitizing component is a quantum dot, and the light-emitting component is any one of the below-indicated compounds.

Figure 3:
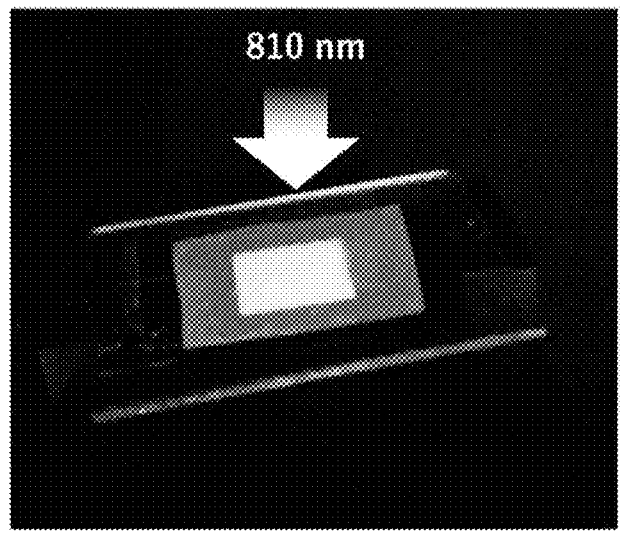

FIG. 3 is a photographic image for showing up-conversion when light having an intensity as low as that of sunlight enters the up-conversion film of Example 1.

Figure 4:
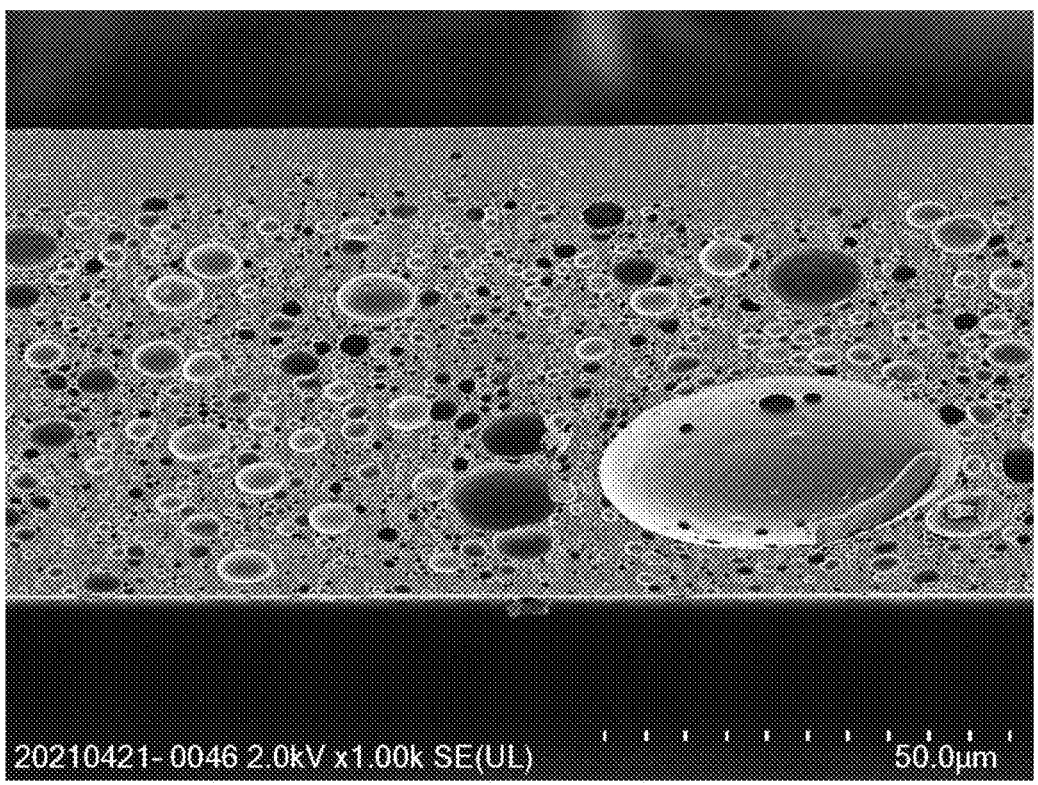

FIG. 4 is a scanning electron microscope (HEM) photographic image of a section of the up-conversion film of Example 3.

Figure 5:
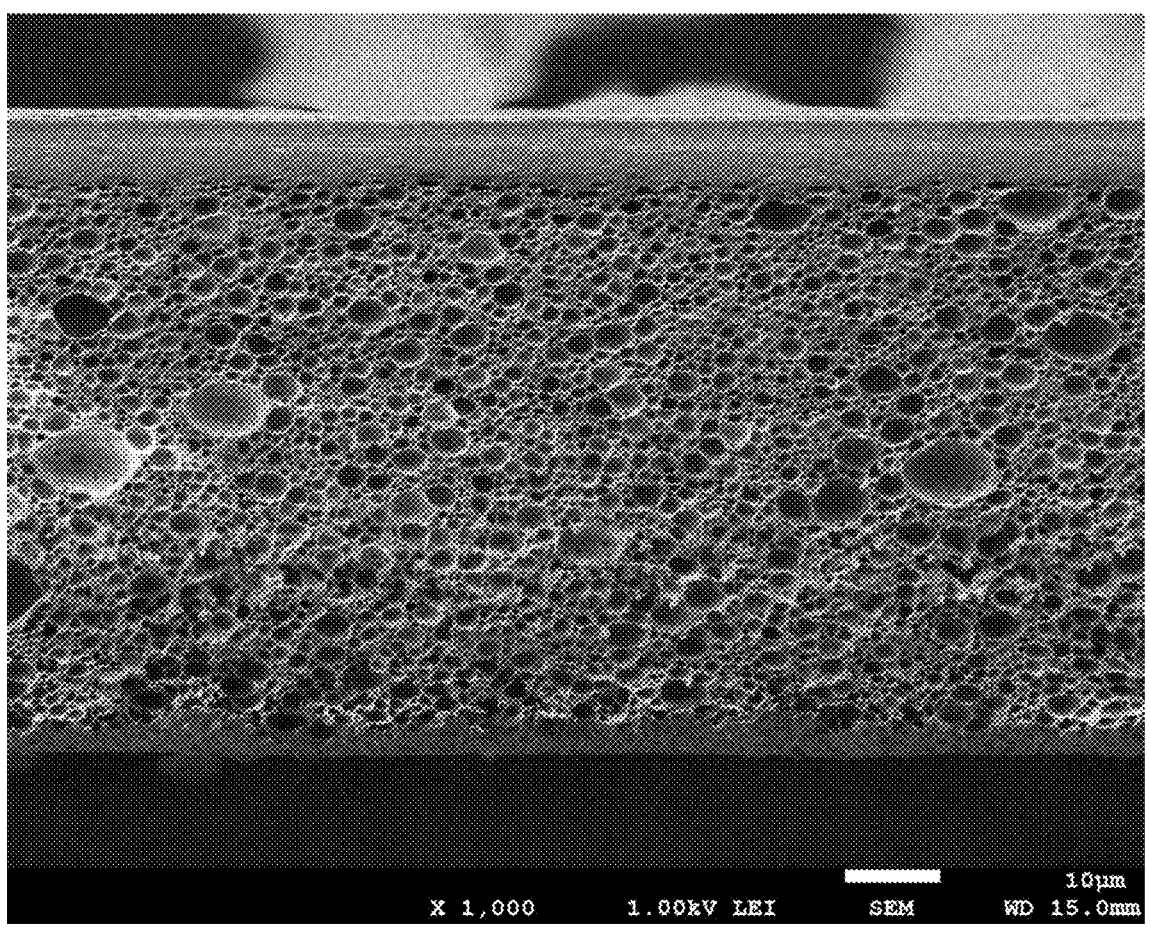

FIG. 5 is a scanning electron microscope (SEM) photographic image of a section of the up-conversion film of Example 7.

Description of Embodiments

Embodiments of the present invention are described below. However, the present invention is not limited to these embodiments.

A. Photon Up-conversion Film

A-1. Mechanism of Photon Up-conversion

Figure 1:
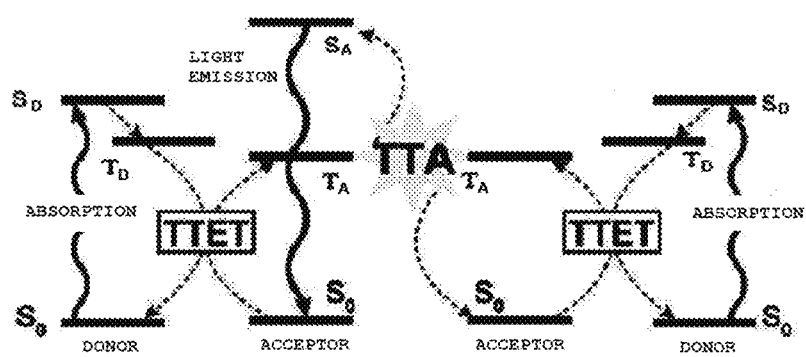
FIG. 1 is a conceptual view of an energy level for describing the mechanism of up-conversion.

The mechanism of up-conversion is described with reference to FIG. 1. First, a donor absorbs incident light, and hence an excited triplet state $T_D$ is produced by intersystem crossing from an excited singlet state $S_D$. Next, triplet-triplet energy transfer (TTET) from the donor to an acceptor occurs to produce the excited triplet state $T_A$ of the acceptor. Next, the molecules of the acceptor in the excited triplet state $T_A$ diffuse and collide with each other to cause triplet-triplet annihilation (TTA). As a result, a high excited singlet energy state $S_A$ of the acceptor is produced. Up-conversion light (light having energy larger than that of excited light) is emitted from the high excited singlet energy state $S_A$.

A-2. Entire Configuration of Photon Up-conversion Film

A photon up-conversion film (hereinafter sometimes simply referred to as "up-conversion film") according to an embodiment of the present invention includes: a matrix including a resin; and a pore portion. That is, the up-conversion film is typically a porous film. The up-conversion film includes at least a sensitizing component (donor) capable of absorbing light in a first wavelength region λ1, and a light-emitting component (acceptor) capable of radiating light in a second wavelength region λ2 including wavelengths shorter than those of the first wavelength region λ1. In the embodiment of the present invention, the sensitizing component and the light-emitting component are present at an interface between the matrix and the pore portion of the porous film. Typically, the sensitizing component and the light-emitting component are present at the interface between the matrix and the pore portion under the state of being mixed with each other. Typically, the sensitizing component and the light-emitting component are positioned close to each other so that energy transfer may be possible. A production method to be described in the section B to be described later enables the sensitizing component and the light-emitting component to be present at the interface between the matrix and the pore portion of the porous film. The fact that the sensitizing component and the light-emitting component are present at the interface between the matrix and the pore portion may be recognized on the basis of the result of time-of-flight secondary ion mass spectrometry (TOF-SIMS) and a scanning electron microscope (SEM) photographic image. A method of identifying the position at which each of the sensitizing component and the light-emitting component is present is described in detail in Examples below. When the up-conversion film is formed from the porous film, and the sensitizing component and the light-emitting component are caused to be present at the interface between the matrix and the pore portion, up-conversion emission intensity up to about several hundreds of times as high as that of an up-conversion film including a resin film in which the sensitizing component and the light-emitting component are merely mixed with each other can be achieved. Considerable part of such advantage may be obtained by forming the up-conversion film from the porous film. More specifically, it is assumed that the foregoing may be attributable to the following mechanism. When the up-conversion film is formed from the porous film, the diffusion scattering of up-conversion light are repeated in the film, and hence the efficiency with which the light is extracted from the film can be drastically improved. In addition, the aggregation of the molecules of the sensitizing component and/or the molecules of the light emitting component that may be responsible for the deactivation of a triplet exciton can be significantly suppressed. Further, when the sensitizing component and the light-emitting component are caused to be present at the interface between the matrix and the pore portion, the sensitizing component and the light-emitting component are suppressed from being taken in the entangled resin molecules of the matrix. As a result, the frequency at which the molecules of the light-emitting component diffuse and collide with each other can be markedly increased. The mechanism described herein is merely assumptive, and hence does not deny the possibility of any other mechanism nor constrain the present invention.

In one embodiment, the photon up-conversion film is capable of up-conversion emission in a temperature range of from −196° C. to 180° C. When the sensitizing component and the light-emitting component are each dissolved in a solvent to be present under a liquid state, up-conversion emission at a temperature equal to or less than the melting point of the solvent becomes difficult. In contrast, the sensitizing component and the light-emitting component in the photon up-conversion film in this embodiment are each assumed to be present not under a liquid state but under a solid state (or a state relatively closer to a solid than to a liquid). Accordingly, the photon up-conversion film is capable of up-conversion emission over the entirety of the temperature range of from −196° C. to 180° C.

The porosity of the up-conversion film is preferably from 5.0 vol% to 60 vol%, more preferably from 7.0 vol% to 60 vol%, still more preferably from 7.0 vol% to 50 vol%. When the porosity falls within such ranges, the sensitizing component and the light-emitting component can be appropriately caused to be present at the interface between the matrix and the pore portion. The porosity may be controlled by adjusting the ratio of the oil droplets of an oil-in-water emulsion or the ratio of the water droplets of a water-in-oil emulsion the production of the up-conversion film. Details about a method of producing the up-conversion film are described in the section B to be described later. The porosity may be calculated from the value of the refractive index of the film measured with, for example, an ellipsometer through use of Lorentz-Lorenz's formula, or may be determined from a scanning electron microscope (SEM) image thereof by any appropriate image analysis processing.

The surface density of the up-conversion film is preferably from 0.002 g/cm² to 0.006 g/cm², more preferably from 0.0025 g/cm² to 0.0055 g/cm², still more preferably from 0.003 g/cm² to 0.005 g/cm². When the surface density falls within such ranges, the above-mentioned desired porosity is easily achieved. The surface density may be determined by, for example, measuring the weight of a test sample punched into a predetermined shape with an electronic balance, and dividing the measured value by the area of the main surface of the test sample.

The density of the up-conversion film is preferably from 0.3 g/cm³ to 1.7 g/cm³, more preferably from 0.35 g/cm³ to 1.6 g/cm³, still more preferably from 0.4 g/cm³ to 1.5 g/cm³. When the density falls within such ranges, the above-mentioned desired porosity is easily achieved. The density may be determined by, for example, measuring the weight of a test sample punched into a predetermined shape with an electronic balance, and dividing the measured value by the volume of the test sample.

The up-conversion film may be a porous film having any appropriate micropores. In other words, the pore portion of the up-conversion film may have any appropriate microporous structure. In one embodiment, the pore portion may have a microporous structure similar to that of pumice. In addition, as described in the section B to be described later, it may be assumed that the pore portion may be formed by, for example, applying an external force and/or heat to oil droplet portions compressed in the dried coating film of an oil-in-water emulsion to release a pressure in the compressed oil droplet portions, to thereby establish a state in which the oil droplet portions seem to be foamed in a pseudo manner. Accordingly, in one embodiment, the pore portion may have a pseudo-foamed structure (cell structure).

The pore portion may include only closed cells, may have an open-cell structure in which a plurality of cells are continuous with each other, or may include a combination thereof.

The average size of the pores (holes) of the pore portion is preferably from 0.2 µm to 400 µm, more preferably from 0.2 µm to 200 µm, still more preferably from 0.2 µm to 100 µm. When the average size of the pores (holes.) falls within such ranges, the sensitizing component and the light-emitting component can be appropriately caused to be present at the interface between the matrix and the pore portion. The average size of the pores (holes) may be controlled by adjusting the average size of the oil droplets of an oil-in-water emulsion or the average size of the water droplets of a water-in-oil emulsion in the production of the up-conversion film. The average size of the pores (holes) may be measured by a BET test method, or maybe determined from a SEM image of the film by any appropriate image analysis processing.

The thickness of the up-conversion film is preferably from 5 µm to 200 µm, more preferably from 10 µm to 150 µm, still more preferably from 15 µm to 100 µm. When the thickness of the up-conversion film falls within such ranges, a desired pore portion can be satisfactorily formed over an entire region in the thickness direction of the film. When the thickness is excessively large, no pore is formed in a central portion in the thickness direction of the film, with the result that desired up-conversion cannot be achieved in some cases. When the thickness is excessively small, the shape of the film cannot be maintained in some cases.

The pore portion of the up-conversion film is not filled with a liquid (typically, a liquid containing the sensitizing component and the light-emitting component). Accordingly, even when a material for the up-conversion film is formed into a film shape (in particular, such a thin film shape as described above), the liquid does not exude to the surface of the up-conversion film, and hence the up-conversion film may be suitably adopted in various industrial products. When the pore portion of the up-conversion film is not filled with the liquid, a solvent to be used in the production of the up-conversion film may remain in the up-conversion film. For example, a gas, such as the vapor of the solvent or water vapor, or a product of a shape similar to a pellet shape, the product being obtained by swelling a coloring matter, is assumed to be present in the pore portion.

A-3. Matrix

As described above, the matrix includes the resin. The resin may be appropriately selected in accordance with the method of producing the up-conversion film. Specifically, the resin may be a water-soluble resin or an oil-soluble resin.

Any appropriate water-soluble resin may be used as the water-soluble resin as long as the matrix is formed. Specific examples of the water-soluble resin include a polystyrene sulfonic acid salt, polyethylene oxide, a polyethyleneimine, a polyvinyl alcohol-based resin, and a cellulose-based resin. An example of the polystyrene sulfonic acid salt is sodium polystyrene sulfonate. An example of the polyethylene imine is a polyethyleneimine hydrochloric acid salt.

Examples of the polyvinyl alcohol-based resin include polyvinyl alcohol, amine-Modified polyvinyl alcohol, and carboxylic acid-modified polyvinyl alcohol. An example of the cellulose-based resin is hydroxyethyl cellulose.

In addition, any appropriate oil-soluble resin may be used as the oil-soluble resin as long as the matrix is formed. Specific examples of the oil-soluble resin include a (meth) acrylic resin, polystyrene, a polycarbonate-based resin, and a polyester-based resin. An example of the (meth)acrylic resin is polymethyl methacrylate (PMMA). An example of the polyester-based resin is polyethylene terephthalate (PET).

A Hansen solubility parameter (HSP) distance Ra between the resin for forming the matrix, and each of the sensitizing component and the light-emitting component is, for example, 10 $(MPa)^{1/2}$ or more, and is, for example, 11 $(MPa)^{1/2}$ or more, preferably 12 $(MPa)^{1/2}$ or more, more preferably 15 $(MPa)^{1/2}$ or more, still more preferably 18 $(MPa)^{1/2}$ more. Meanwhile, the HSP distance Ra between the resin for forming the matrix, and each of the sensitizing component and the light-emitting component is, for example, 25 $(MPa)^{1/2}$ or less, preferably 23 $(MPa)^{1/2}$ or less, more preferably 21 $(MPa)^{1/2}$ less. The fact that the HSP distance Ra falls within such ranges means that an affinity between the resin for forming the matrix, and each of the sensitizing component and the light-emitting component is low. As a result, the movement of each of the sensitizing component and the light-emitting component into the matrix is significantly suppressed, and hence the sensitizing component and the light-emitting component can be caused to be present at the interface between the matrix and pore portion of the porous film by a synergistic effect with an effect exhibited by the production method to be described later in the section B.

A HSP is represented by a vector obtained by dividing a Hildebrand solubility parameter into three components, that is, a dispersion force ($\delta D$), a permanent dipole intermolecular force ($\delta P$), and a hydrogen bonding force ($\delta H$), and plotting the components in a three-dimensional space. Components whose vectors obtained as described above are similar to each other can be judged to have high solubilities. That is, a degree of similarity between the solubilities can be judged from the HSP distance Ra between the components. The definition and calculation of the HSP are described in "Hansen Solubility Parameters: A User's Handbook" written by Charles M. Hansen (CRC Press, LLC, 2007). Known values are available as the HSP values of various resins and solvents, and these values may be used as they are, or values calculated by using Hansen Solubility Parameters in Practice (HSPiP) that is computer software may be used. The HSPiP includes databases for resins and solvents.

The HSP distance Ra between the resin (HSP value: $\delta D_R$, $\delta P_R$, $\delta H_R$) and the sensitizing component or the light-emitting component (HSP value: $\delta D_C$, $\delta P_C$, $\delta H_C$) may be calculated from the equation (1).

$$Ra=\{4\times(\delta D_R-\delta D_C)^2+(\delta P_R-\delta P_C)^2+(\delta H_R-\delta H_C)^2\}^{1/2} \quad \ldots (1)$$

In the equation (1), $\delta D_R$ represents the dispersion force of the resin, $\delta P_R$ represents the permanent dipole intermolecular force of the resin, $\delta H_R$ represents the hydrogen bonding force of the resin, $\delta D_C$ represents the dispersion force of the sensitizing component or the light-emitting component, $\delta P_C$ represents the permanent dipole intermolecular force of the sensitizing component or the light-emitting component, and $\delta P_C$ represents the hydrogen bonding force of the sensitizing component or the light-emitting component.

A-4. Sensitizing Component and Light-emitting Component

A-4-1. Sensitizing Component

As is apparent from the mechanism described in the section A-1, the sensitizing component absorbs light (incident light), is brought into an excited triplet state by intersystem crossing from an excited singlet state, and causes triplet-triplet energy transfer in the light-emitting component. The sensitizing component is, for example, a compound having a porphyrin structure, a phthalocyanine structure, or a fullerene structure. Such compound may contain a metal atom in a molecule thereof. Examples of the metal atom include Pt, Pd, Zn, Ru, Re, Ir, Os, Cu, Ni, Co, Cd, Au, Ag, Sn, Sb, Pb, P, and As. Of those, Pt, Pd, and Os are preferred. Specific examples of compounds each of which can function as the sensitizing component are described later in the section A-4-3.

The sensitizing component may be a quantum dot. The quantum dot may include any appropriate material. The quantum dot may include preferably an inorganic material, more preferably an inorganic conductor material or an inorganic semiconductor material. Examples of the semiconductor material include Group II-VI, Group III-V, Group IV-VI, and Group IV semiconductors. Specific examples thereof include Si, Ge, Sn, Se, Te, B, C (including diamond), P, BN, BP, BAs, AlN, AlP, AlAs, AlSb, GaN, GaP, GaAs, GaSb, InN, InP, InAs, InSb, AlN, AlP, AlAs, AlSb, GaN, GaP, GaAs, GaSb, ZnO, ZnS, ZnSe, ZnTe, CdS, CdSe, CdSeZn, CdTe, HgS, HgSe, HgTe, BeS, BeSe, BeTe, MgS, MgSe, GeS, GeSe, GeTe, SnS, SnSe, SnTe, PbO, PbS, PbSe, PbTe, CuF, CuCl, CuBr, CuI, $Si_3N_4$, $Ge_3N_4$, $Al_2O_3$, (Al, Ga, In)$_2$(S, Se, Te)$_3$, $Al_2CO$, and combinations (composites) thereof.

The sensitizing component is incorporated into the up-conversion film at a ratio of preferably from $7.00\times10^{-9}$ mol to $5.00\times10^{-6}$ mol, more preferably from $1.00\times10^{-6}$ to $3.00\times10^{-6}$ mol, still more preferably from $4.50\times10^{-8}$ mol to $2.00\times10^{-6}$ mol with respect to 1 g of the resin for forming the matrix. When the content of the sensitizing component is excessively small, a sufficient amount of triplet excitons are not produced, and hence the efficiency with which triplet-triplet annihilation occurs becomes insufficient in some cases. When the content of the sensitizing component is excessively large, the efficiency of up-conversion may be insufficient owing to triplet-triplet annihilation between the molecules of the sensitizing component, or the reabsorption of up-conversion emission energy.

A-4-2. Light-emitting Component

As is apparent from the mechanism described in the section A-1, the light-emitting component functions as follows: the light-emitting component receives the triplet-triplet energy transfer from the sensitizing component to produce an excited triplet state, and the molecules of the light-emitting component in the excited triplet state diffuse and collide with each other to cause triplet-triplet annihilation, to thereby produce an excited singlet having a higher energy level. Various compounds each having a fused aromatic ring have each been known as the light-emitting component. Specific examples thereof include compounds each having a naphthalene structure, an anthracene structure, a pyrene structure, a perylene structure, a tetracene, structure, a borondipyrromethene structure (Bodipy structure), or a diketopyrrolopyrrole structure. Specific examples of compounds each of which can function as the light-emitting component are described later in the section A-4-3.

The light-emitting component is incorporated into the up-conversion film at a ratio of preferably from $5.00\times10^{-6}$ mol to $7.00\times10^{-5}$ mol, more preferably from $6.00\times10^{-6}$ mol to $6.00\times10^{-5}$ mol, still more preferably from $7.00\times10^{-6}$ mol to $5.00\times10^{-5}$ mol with respect to 1 g of the resin for forming the matrix. When the content of the light-emitting component is excessive small, a distance between the molecules of the light-emitting component may enlarge to preclude the diffusion of a triplet exciton received from a sensitizing coloring matter between the molecules of the light-emitting component. When the content of the light-emitting component is excessively large, concentration quenching may occur to lead to the deactivation of the triplet exciton.

A blending ratio (sensitizing component:light-emitting component) (molar ratio) between the sensitizing component and the light-emitting component is preferably from 1:10 to 1:7,000, more preferably from 1:25 to 1:3,000, still more preferably from 1:30 to 1:200, particularly preferably from 1:35 to 1:100. When the blending ratio falls within such ranges, a triplet exciton produced from the sensitizing component efficiently moves to a light-emitting coloring matter, and hence deactivation between the molecules of the light-emitting coloring matter is suppressed to the fullest extent. Thus, triplet-triplet annihilation can be satisfactorily achieved.

A-4-3. Combination of Sensitizing Component and Light-emitting Component

A preferred combination of the sensitizing component and the light-emitting component in accordance with the wavelengths of incident light and up-conversion light is as described below.

The sensitizing component that absorbs light in the wavelength region λ1 ranging from 510 nm to 550 nm is any one of the below-indicated compounds, and the light-emitting component that radiates (emits) light in the wavelength region λ2 ranging from 400 nm to 500 nm is any one of the below-indicated compounds. The combination can perform the up-conversion of green light into blue light.

<Sensitizing Component>
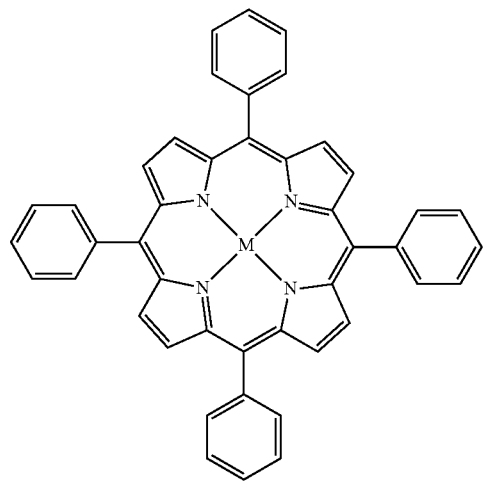
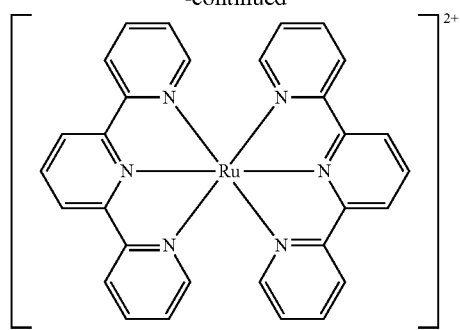
M = Pt, Pd
<Light-emitting Component>
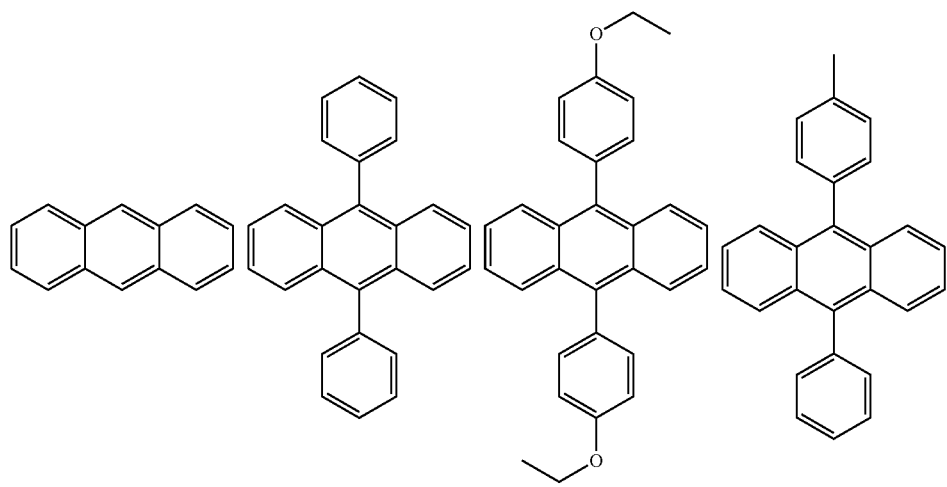

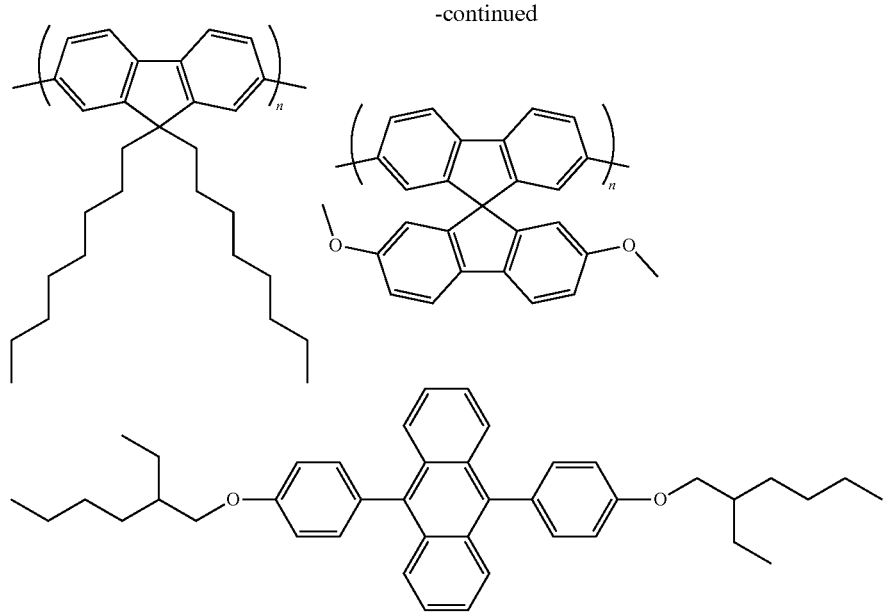

The sensitizing component that absorbs light in the wavelength region λ1 ranging from 610 nm to 650 nm is any one of the below-indicated compounds, and the light-emitting component that radiates (emits) light in the wavelength region λ2 ranging from 500 nm to 600 nm is any one of the below indicated compounds. The combination can perform the up-conversion of red light into yellow-green light.

<Sensitizing Component>

-continued

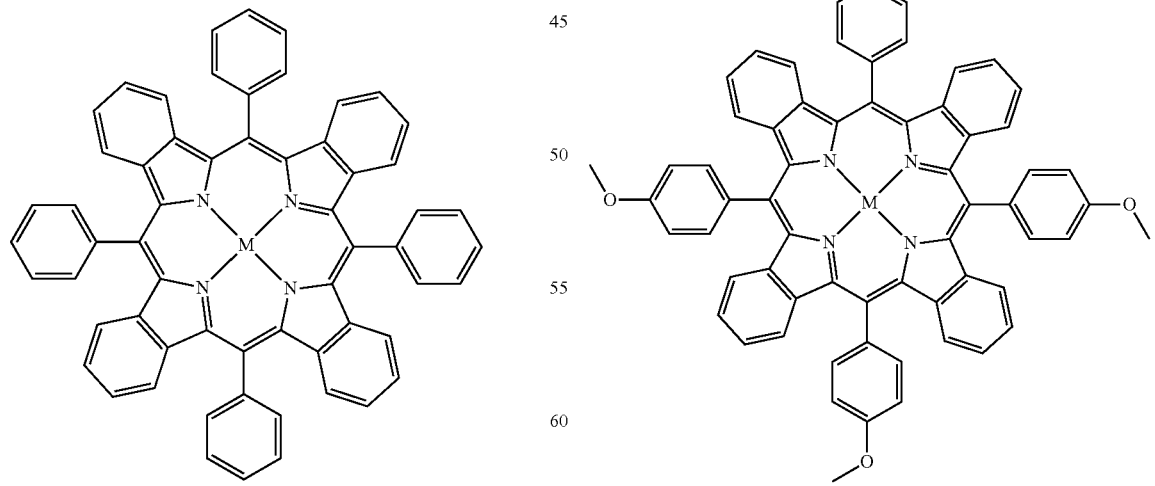

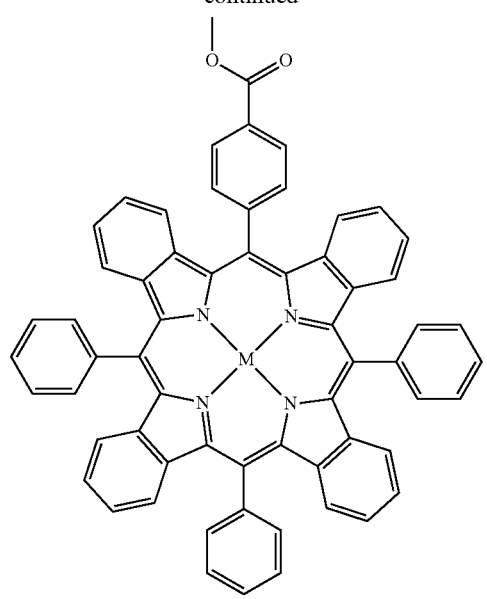

M = Pt, Pd

<Light-emitting Component>

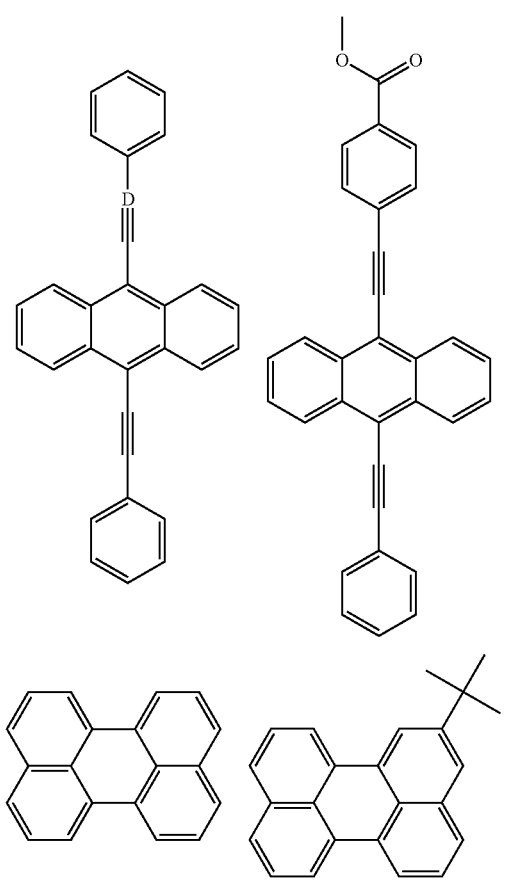

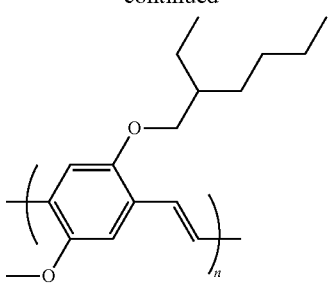

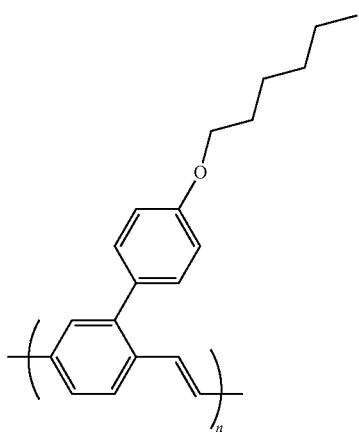

The sensitizing component that absorbs light in the wavelength region λ1 ranging from 700 nm to 810 nm is any one of the below-indicated compounds, and the light-emitting component that radiates (emits) light in the wavelength region λ2 ranging from 500 nm to 700 nm is any one of the below-indicated compounds. The combination can perform the up-conversion of near-infrared light into visible light (red light to green light).

<Sensitizing Component>

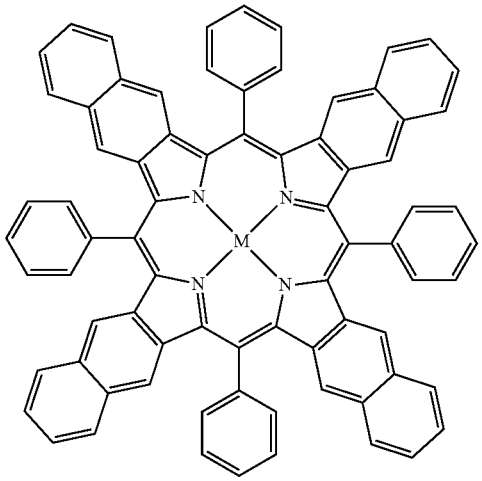

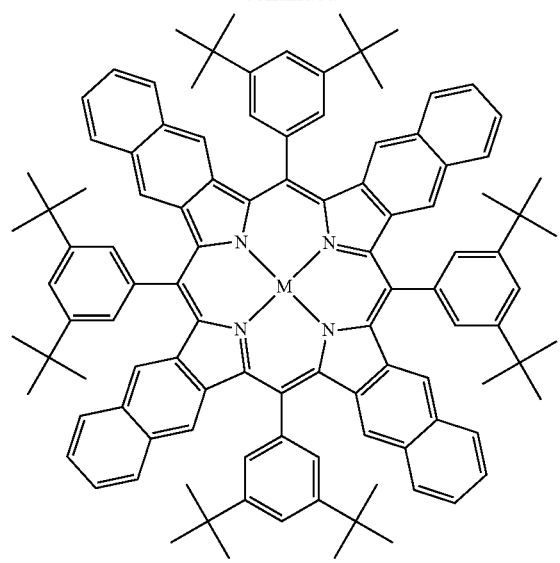
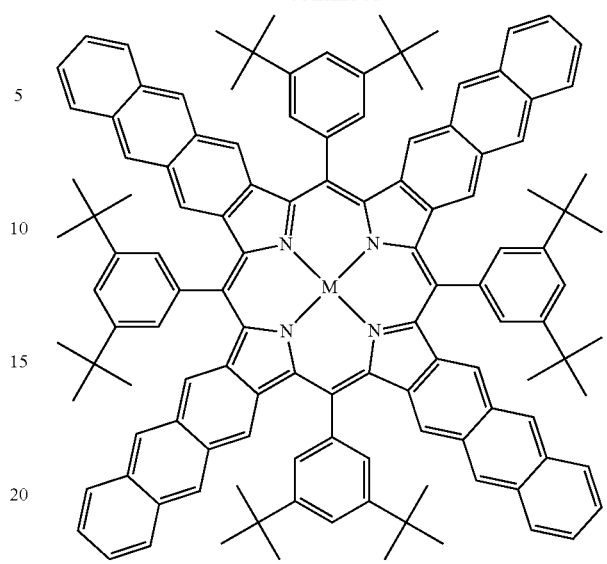
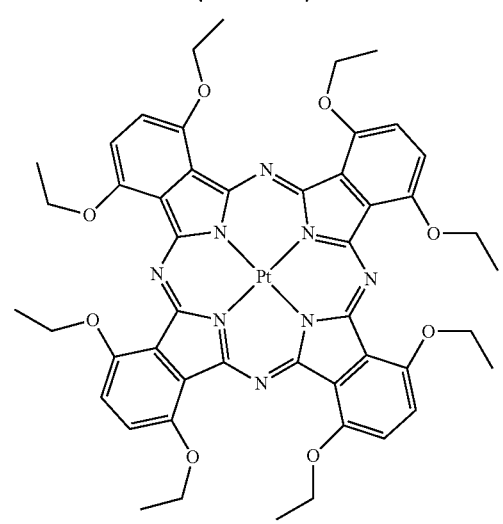
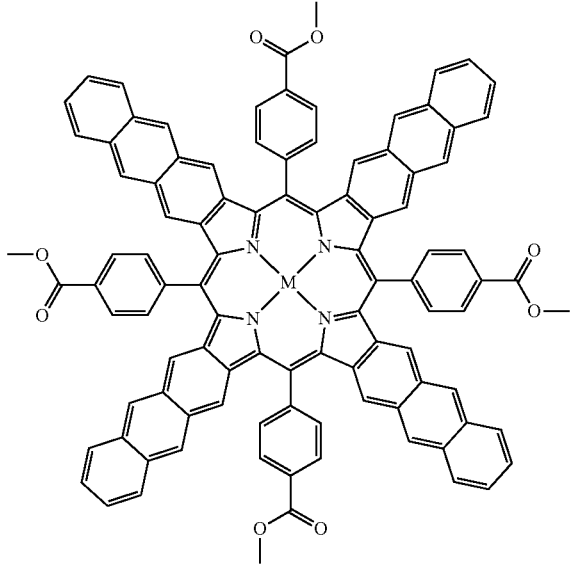
M = Pt, Pd

<Light-emitting Component>
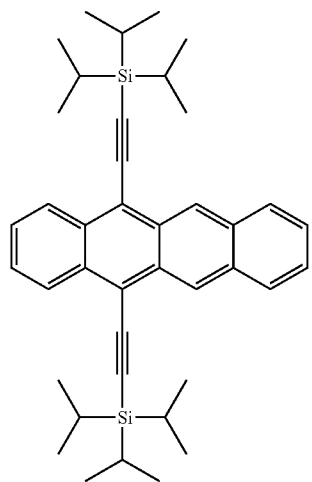
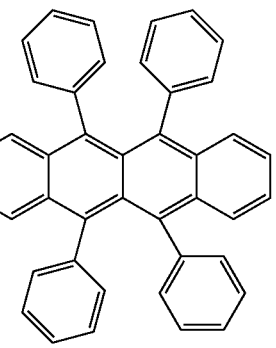
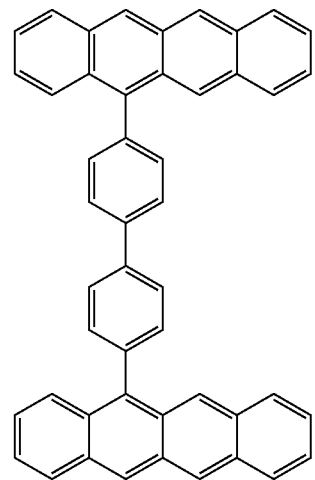
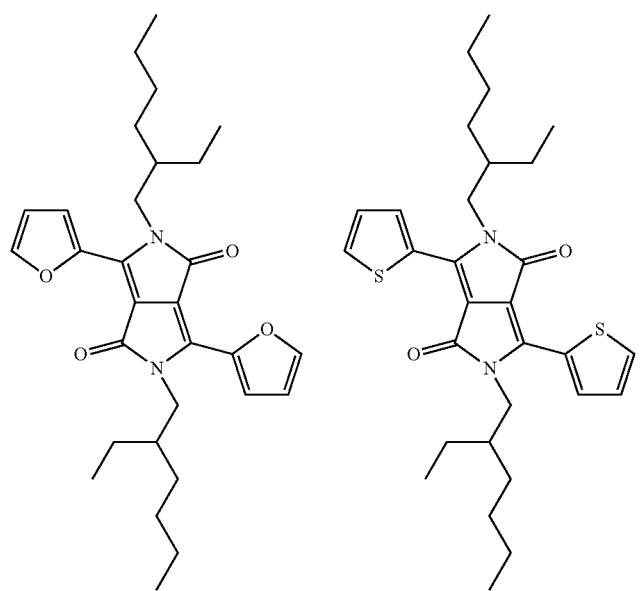

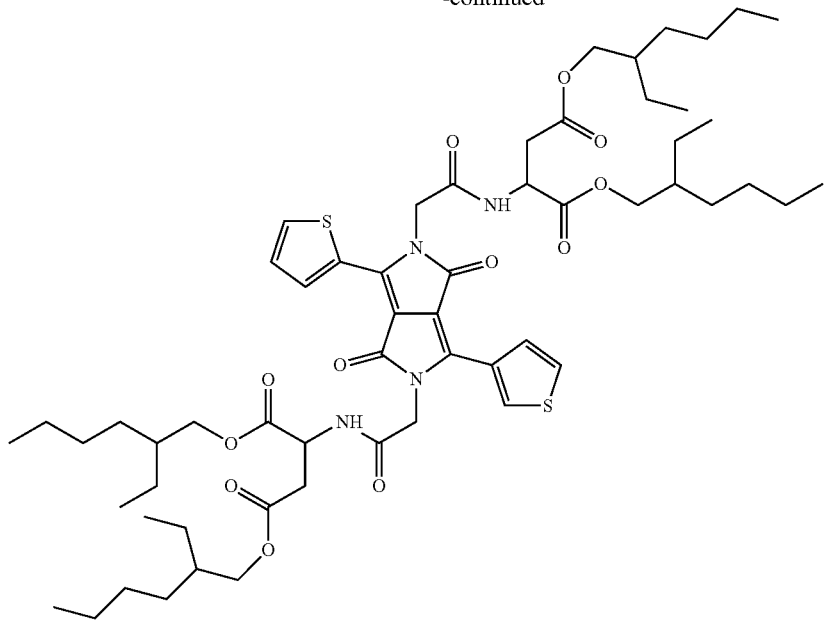

The sensitizing component that absorbs light in the wavelength region λ1 ranging from 700 nm to 730 nm is any one of the below-indicated compounds, and the light-emitting component that radiates (emits) light in the wavelength region λ2 ranging from 400 nm to 500 nm is any one of the below-indicated compounds. The combination can perform the up-conversion of near-infrared light into visible light (blue light).

<Sensitizing Component>

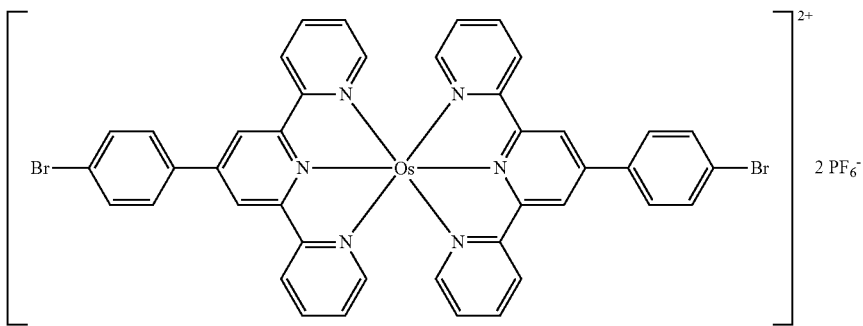

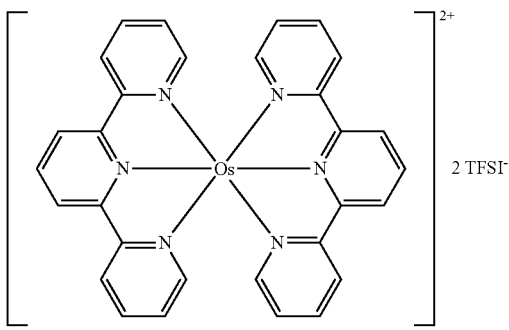

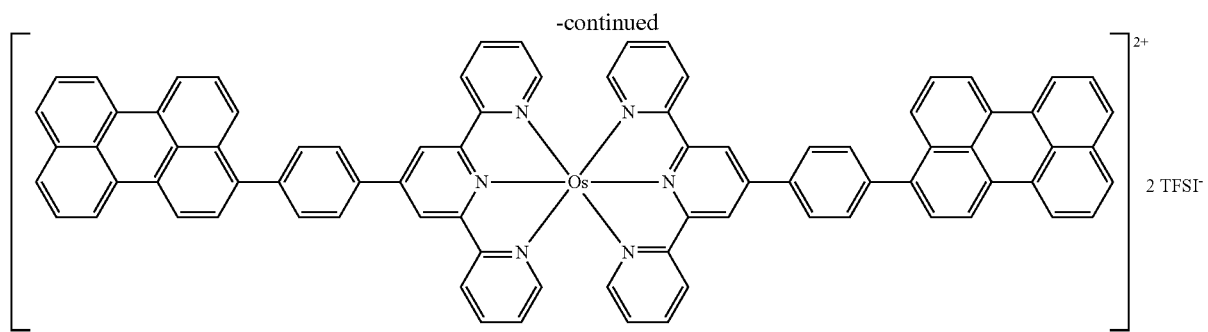

<Light-emitting Component>

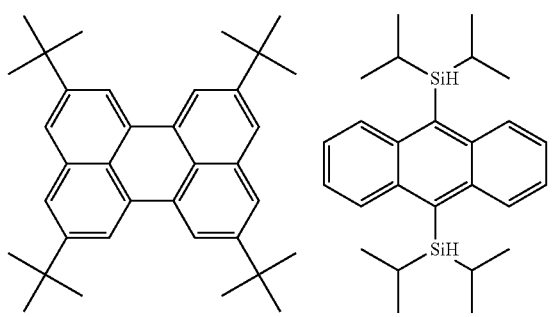

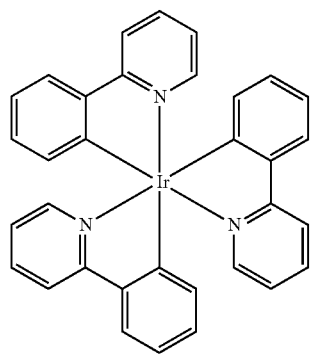

The sensitizing component that absorbs light in the wavelength region λ1 ranging from 410 nm to 500 nm is any one of the below-indicated compounds, and the light-emitting component that radiates (emits) light in the wavelength region λ2 ranging from 300 nm to 400 nm is any one of the below-indicated compounds. The combination can perform the up-conversion of blue light into ultraviolet light.

<Sensitizing Component>

<Light-emitting Component>

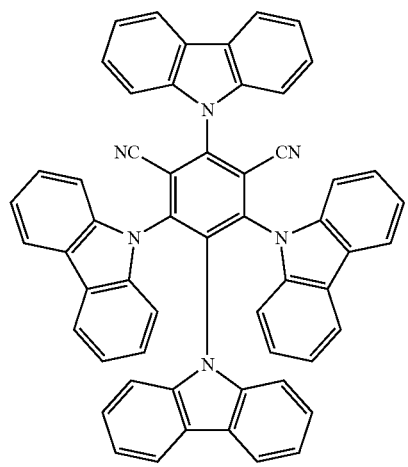

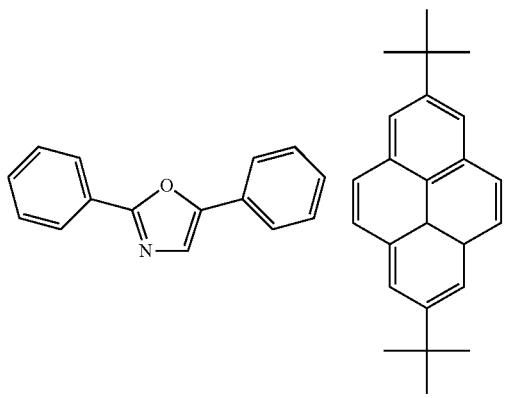

-continued

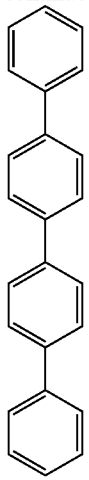

The sensitizing component that absorbs light in the wavelength region λ1 near the range of from 630 nm to 640 nm (e.g., 635 nm) is a quantum dot (CdSe or CdSe/ZnS), and the light emitting component that radiates (emits) light in the wavelength region λ2 near the range of from 440 nm to 460 nm (e.g., 450 nm) is the below-indicated compound. The combination can perform the up-conversion of near-infrared light into visible light (blue light).

<Light-emitting Component>

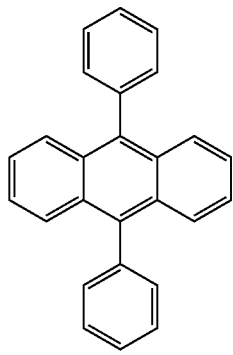 [SMILES: c1ccc(-c2c3ccccc3c(-c3ccccc3)c3ccccc23)cc1]

The sensitizing component that absorbs light in the wavelength region λ1 near the range of from 970 nm to 990 nm (e.g., 980 nm) is a quantum dot (PbSe or PbS/CdS), and the light-emitting component that radiates (emits) light in the wavelength region λ2 near the range of from 550 nm to 570 nm (e.g., 560 nm) is the below-indicated compound. The combination can perform the up-conversion of near-infrared light into visible light (green light).

<Light-emitting Component>

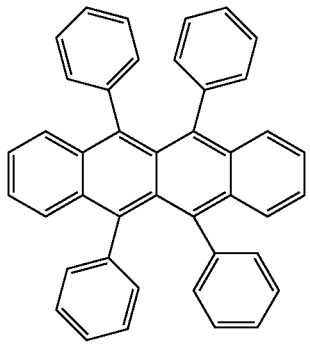 [SMILES: c1ccc(-c2c3ccccc3c(-c3ccccc3)c3c(-c4ccccc4)c4ccccc4c(-c4ccccc4)c23)cc1]

B. Method of producing Up-conversion Film

Typical examples of a method of producing an up-conversion film are described. Specifically, an embodiment in which an oil-in-water (O/W) emulsion is used, and an embodiment in which a water-in-oil (W/O) emulsion is used are described.

B-1. Embodiment in which O/W Emulsion is used

A production method according to this embodiment includes: preparing an oil-in-water emulsion from an aqueous solution of a water-soluble resin, and an oily solvent solution of a sensitizing component and a light-emitting component, or an oily solvent dispersion thereof (hereinafter sometimes collectively referred to as "oily solvent solution or the like"); applying the oil-in-water emulsion to a substrate to form a coating film; drying the coating film; and applying an external force and/or heat to the dried coating film to form a film, which includes a matrix including the water-soluble resin and a pore portion, and in which the sensitizing component and the light-emitting component are present at an interface between the matrix and the pore portion. The respective steps are specifically described below.

<Preparation of Emulsion>

The water-soluble resin is as described in the above-mentioned section A-3. The concentration of the aqueous solution may be, for example, from 3 wt% to 20 wt%, and may be, for example, from 5 wt% to 10 wt%. The sensitizing component and the light-emitting component are each as described in the above-mentioned section A-4. For example, a solvent having volatility may be used as an oily solvent. Specific examples of such solvent include: esters, such as ethyl acetate, butyl acetate, and propyl acetate; aromatic hydrocarbons, such as toluene and benzene; alicyclic hydrocarbons, such as cyclohexane, cyclopentanone, and methylcyclohexane; aliphatic hydrocarbons such as hexane; ketones such as methyl ethyl ketone; and halogenated hydrocarbons, such as chloroform and dichloromethane. The concentration of the sensitizing component in the oily solvent solution or the like may be, for example, from 0.001 mM to 1 mM, and the concentration of the light-emitting component therein may be, for example, from 1 mM to 50 mM. The aqueous solution of the water-soluble resin, and the oily solvent solution or the like of the sensitizing component and the light-emitting component are mixed with each other so that the blending amounts of the sensitizing component and the light-emitting component with respect to the water-soluble resin (matrix resin) may fall within the desired ranges described in the section A-4. The amount of the aqueous solution and the amount of the oily solvent solution or the like to be mixed with each other can be adjusted by adjusting the concentration of the water-soluble resin in the aqueous solution, and the concentration of the sensitizing component and the concentration of the light-emitting component in the oily solvent solution or the like. As a result, the concentration (e.g., volume fraction) and sizes of oil droplets (hereinafter sometimes referred to as "emulsion particles") in the emulsion can be adjusted, and hence the porosity and pore (hole) sizes of the up-conversion film to be obtained can be adjusted.

The emulsion may be prepared by any appropriate method. The emulsion may be prepared by, for example, mixing the aqueous solution of the water-soluble resin, and the oily solvent solution or the like of the sensitizing component and the light-emitting component with each other, and emulsifying the mixed liquid with a homogenizer. The resultant emulsion may be defoamed as required. The volume fraction of the emulsion particles may be, for example, from 2% to 25%. When the volume fraction of the emulsion particles falls within such range, an up-conversion film having a desired porosity may be obtained. The average particle diameter of the emulsion particles may be, for example, from 0.2 µm to 400 µm. When the average particle diameter of the emulsion particles falls within such range, an up-conversion film having desired pore (hole) sizes may be obtained.

<Formation and Drying of Coating Film>

Next, the emulsion obtained in the foregoing is applied to the substrate to form the coating film. The substrate is typically, for example, a resin sheet or glass. Any appropriate resin may be used as a resin for forming the resin sheet. Specific examples thereof include polyimide-based resins, cellulose-based resins such as triacetyl cellulose (TAC), and transparent resins, such as polyester-based, polyvinyl alcohol-based, polycarbonate-based, polyamide-based, polyether sulfone-based, polysulfone-based, polystyrene-based, polynorbornene-based, polyolefin-based, (meth) acrylic, and acetate-based resins. The examples also include (meth)acrylic, urethane-based, (meth)acrylic urethane-based, epoxy-based, and silicone-based thermosetting resins or UV-curable resins. The examples further include glassy polymers such as a siloxane-based polymer. Any appropriate method may be used as a method for the application. Specific examples thereof include a roll coating method, a spin coating method, a wire bar coating method, a dip coating method, a die coating method, a curtain coating method, spray coating method, and a knife coating method (e.g., a comma coating method). In addition, the coating film may be formed by using a drum film-forming machine. In this case, the film-forming roll (drying roll) of the drum film-forming machine can function as the substrate. The film-forming roll (drying roll) is formed from, for example, a metal, such as nickel, chromium, copper, iron, or stainless steel. The temperature of the emulsion at the time of the application may be, for example, from 10° C. to 60° C. The thickness of the coating film is adjusted so that the thickness of the up-conversion film to be obtained may fall within the desired range (e.g., from 5 µm to 200 µm) described in the above-mentioned section A-2. The thickness of the coating film may be, for example, from 100 µm to 1,000 µm.

Next, the coating film is dried. The drying is performed with any appropriate means (e.g., an oven). A drying temperature may be, for example, from 60° C. to 90° C., and a drying time may be, for example, from 20 minutes to 60 minutes. The drying may provide a dried coating film having a thickness substantially identical to that of the up-conversion film to be obtained. Typically, the dried coating film may be naturally cooled to room temperature.

<Formation of Up-conversion Film>

Figure 2:
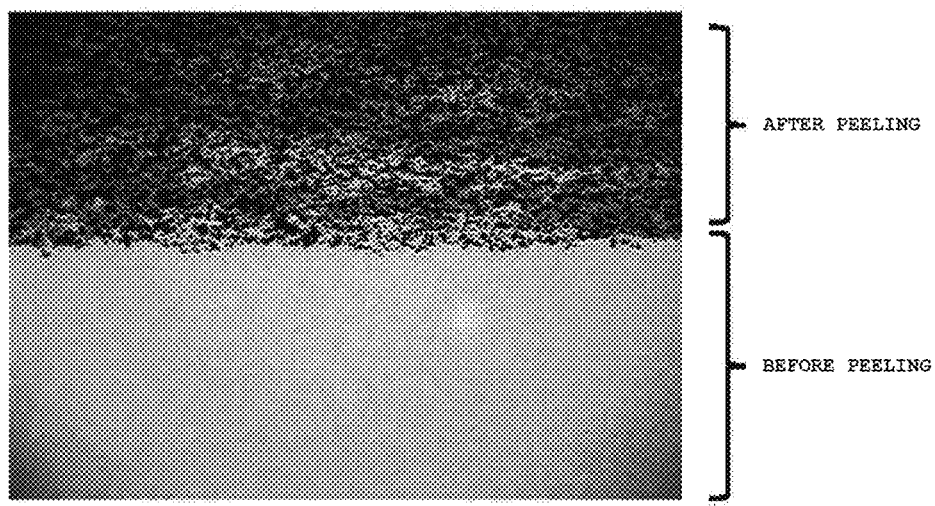
FIG. 2 is a microscope image for showing comparison between the states of a dried coating film before and after its peeling from a substrate in a method of producing an up-conversion film according to an embodiment of the present invention.

Finally, the external force and/or the heat is applied to the dried coating film to form the up-conversion film. The application of the external force and/or the heat to the dried coating film forms the pore portion, and arranges the sensitizing component and the light-emitting component at the interface between the matrix including the water-soluble resin and the pore portion. The external force and/or the heat may be applied with any appropriate means. Specific examples of the means for applying the external force out of such means include the peeling of the dried coating film from the substrate, shearing, cutting, bending, vibration, and decompression. In addition, an electric field or a magnetic field may be applied. According to this embodiment, the peeling of the dried coating film from the substrate automatically forms the pore portion, and arranges the sensitizing component and the light-emitting component at the interface between the matrix including the water-soluble resin and the pore portion, and hence can omit a further operation and/or procedure for applying the external force. It is assumed that the formation of the pore portion, and the arrangement of the sensitizing component and the light-emitting component at the interface between the matrix and the pore portion by the application of the external force may be attributable to the following mechanism. As described above, the drying of the coating film of the emulsion may reduce its thickness to one tenth or less. As a result, the emulsion particles are each brought into a compressed state. This is assumed from the fact that the dried coating film before the peeling from the substrate shows a uniform state in a microscope image (FIG. 2), and the coating film is transparent when visually observed. Further, the sensitizing component and the light-emitting component are substantially present only in the emulsion particles in the emulsion, and even when the emulsion particles are compressed in the dried coating film, the components remain in the compressed emulsion particles without moving into the resin (matrix). The application of the external force (e.g., the peeling of the dried coating film from the substrate) under the state releases a pressure in the compressed emulsion particles to establish a state in which the compressed emulsion particles seem to be foamed in a pseudo manner. Thus, cells (pores) are formed. The formation of the cells (pores) by the peeling is recognized from the microscope image of FIG. 2. The formation of such cells (pores) forms an interface between the cells (pores) and the matrix. As described above, the sensitizing component and the light-emitting component remain in the compressed emulsion particles, and hence the formation of the interface causes the sensitizing component and the light-emitting component to adhere to the interface. Thus, there can be obtained the film, which includes the matrix including the water-soluble resin and the pore portion, and in which the sensitizing component and the light-emitting component are present at the interface between the matrix and the pore portion. The above-mentioned mechanism is merely assumptive, and hence does not deny the possibility of any other mechanism nor constrain the present invention.

B-2. Embodiment in which W/O Emulsion is used

A production method according to this embodiment includes: preparing a water-in-oil emulsion from an oily solvent solution of an oil-soluble resin, and an aqueous dispersion of a sensitizing component and a light-emitting component; applying the water-in-oil emulsion to a substrate to form a coating film; drying the coating film; and forming, through the drying, a film, which includes a matrix including the oil-soluble resin and a pore portion, and in which the sensitizing component and the light-emitting component are present at an interface between the matrix and the pore portion. The oil-soluble resin is as described in the above-mentioned section A-3. The oily solvent solution of the oil-soluble resin, and the aqueous dispersion of the sensitizing component and the light-emitting component are mixed with each other so that the blending amounts of the sensitizing component and the light-emitting component with respect to the oil-soluble resin (matrix resin) may fall within the desired ranges described in the section A-4. Examples of the oily solvent include: aliphatic hydrocarbons, such as n-hexane and n-heptane; alicyclic hydrocarbons, such as cyclohexane, methylcyclohexane, and ethylcyclohexane; aromatic hydrocarbons, such as benzene, toluene, and xylene; esters, such as methyl acetate, ethyl acetate, butyl acetate, isobutyl acetate, propyl acetate, and isoamyl acetate; ketones, such as methyl ethyl ketone, methyl isobutyl ketone, diisobutyl ketone, and cyclohexanone: and halogenated hydrocarbons, such as dichloromethane, chloroform, chlorobenzene, and dichlorobenzene. The amount of the aqueous solution or the like and the amount of the oily solvent solution to be mixed with each other can be adjusted by adjusting the concentration of the oil-soluble resin in the oily solvent solution, and the concentration of the sensitizing component and the concentration of the light-emitting component in the aqueous dispersion. As a result, the concentration (e.g., volume fraction) and sizes of water droplets (emulsion particles) in the emulsion can be adjusted, and hence the porosity and pore (hole) sizes of the up-conversion film to re obtained can be adjusted. The, W/O emulsion of this embodiment uses the sensitizing component and the light-emitting component that do not dissolve the oil solvent nor in water, and the sensitizing component and the light-emitting component in solid states gather between the oily solvent and the water droplets to function as a surfactant, to thereby form the emulsion. As a result, unlike the O/W emulsion described in the section B-1, the pore portion can be formed without application of any external force and/or heat to the dried coating film, and the sensitizing component and the light-emitting component can be arranged at the interface between the matrix including the oil-soluble resin and the pore portion.

Examples

Now the present invention is specifically described by way of Examples. However, the present invention is not limited to these Examples. In Examples, "part(s)" and "%" are by weight unless otherwise specified.

<Example 1>

1. Preparation of Oily Solvent Solution of Sensitizing Component and Light-emitting Component Palladium meso-tetraphenyl-tetraanthraporph (PdTPTAP: the below-indicated chemical formula) was used as a sensitizing component, and rubrene (the below-indicated chemical formula) was used as a light-emitting component. A solution of rubrene and PdTPTAP in toluene was prepared in a glove box. The concentration of PdTPTAP in the solution was set to 0.554 mM, and the concentration of rubrene therein was set to 20 mM. That is, a molar ratio between the sensitizing component and the light-emitting component was set to 1:36. The prepared solution was stored by being hermetically sealed in a vial until an emulsifying step.

<Sensitizing Component>

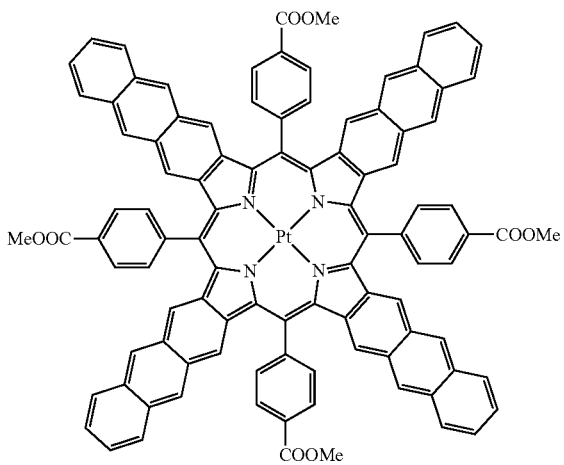

<Light-emitting Component>

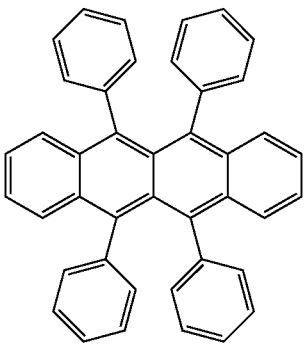 [SMILES: c1ccc(-c2c3ccccc3c(-c3ccccc3)c3c(-c4ccccc4)c4ccccc4c(-c4ccccc4)c23)cc1]

2. Preparation of Emulsion 0.4 Milliliter of the solution obtained in the foregoing was added to 5 g of an aqueous solution (9%) of polyvinyl alcohol (PVA). The addition amount of the solution with respect to 1 g of the PVA was 0.89 ml, the amount (concentration) of the sensitizing component with respect to 1 g of the PVA was $4.92 \times 10^{-7}$ mol, and the amount (concentration) of the light-emitting component with respect thereto was $1.78 \times 10^{-5}$ mol. While the solution was injected with a tube having an inner diameter of 0.75 mm, the mixture was stirred (17,500 rpm) with a homogenizer until its entirety was emulsified. An argon gas was blown onto the resultant emulsified liquid for about 2 minutes, and the emulsified liquid was stirred with stirring machine (THINKY) in a defoaming mode 2,200 rpm) for 3 minutes and in a mixing mode (2,000 rpm) for 7 minutes. Thus, an O/W emulsion was prepared. A product having a polymerization degree of 1,700 and a saponification degree of from 95.5% to 97.5% was used as the PVA.

3. Formation of Up-conversion Film

The O/W emulsion obtained in the foregoing was applied to a polyimide film (substrate) with an applicator so as to have an application thickness of 700 μm. The laminate of the coating film and the polyimide film was dried in a thermostat. A drying temperature was 80° C., and a drying time was 30 minutes. After the drying, the laminate was naturally cooled to room temperature. Finally, the dried coating film was peeled from the polyimide film. Thus, an up-conversion film (thickness: 47 μm) was obtained. SEM observation showed that the resultant film was a porous film having formed therein a pore portion based on a cell structure. A process after the preparation of the emulsion was performed in air and in a dark place (under an environment including only light for a darkroom).

<Optical Evaluation>

The resultant film was irradiated with laser light having a wavelength of 810 nm, an intensity of 110 mW/cm$^2$, and an irradiation diameter of 1.2 mm. An excited light density was adjusted with a ND filter, and was measured in the range of of 5 W/cm$^2$ or less. Up-conversion emission was detected with a spectrometer through an optical fiber, and a detection range was set so that the entire laser diameter fell within the range. As a result, up-conversion emission having a peak wavelength of about 560 nm was observed. The emission peak integrated value (from 500 nm to 730 nm) of the film was 778 times as large as that of the film of Comparative Example 1 to be described later.

<Evaluation of Porous Structure>

The surface density of the resultant film was determined by measuring the weight of a test sample punched into a predetermined shape with an electronic balance, and dividing the measured value by the area of the main surface of the test sample. As a result, the surface density was 0.0041 g/cm$^2$. In addition, the density thereof was determined by measuring the weight of the test sample punched into a predetermined shape with an electronic balance, and dividing the measured value by the volume of the test sample. As a result, the density was 0.8772 g/cm$^3$. With regard to the porosity and average particle diameter of the film, image analysis was performed with image analysis software (ImageJ) through utilization of a difference in brightness between the holes and resin portion of a sectional SEM image thereof to subject the image to binarization processing, and the holes were sampled. Circle-equivalent diameters serving as the diameters of circles having areas corresponding to those of the sampled holes were defined as particle diameters, and an average particle diameter was determined. As a result, the average particle diameter was 0.8 μm. In addition, the volume of each of the particles of the film was determined by using a circle-equivalent diameter calculated from a sphere having a diameter comparable to that of the particle. The porosity was determined by dividing the total of the determined volumes of the particles by the area of the main surface of the sectional SEM image. As a result, the porosity was 40%.

<Evaluation of Position at which each of Sensitizing Component and Light-emitting Component is present>

A section was prepared by cutting the resultant film with an ultramicrotome under a freezing condition (about −60° C.), and then TOF-SIMS analysis was performed. The section of the film was irradiated with a $Bi_3^{2+}$ primary ion (irradiation amount; 2.8×10$^{12}$ ions/cm$^2$) through use of a triple-focus electrostatic analyzer (TRIFT V, manufactured by ULVAC-PHI, Inc.), and a 40-micrometer square marked portion was observed at an acceleration voltage of 30 kV. More specifically, a two-dimensional image was obtained by: imaging the marked portion; setting the indicator ion of the sensitizing component and the light-emitting component (hereinafter referred to as "dye") to m/z 586; and classifying the portion from the other portion by colors. More specifically, in the two-dimensional image, the dye portion was colored green, and the other portion was colored red.

In addition, the section (marked portion) of the above-mentioned film obtained with the ultramicrotome was subjected to conductive treatment, and then a secondary electron image of the section was obtained with a field emission scanning electron microscope (FE-SEM, manufactured by Hitachi, Ltd., SU-8220) at an acceleration voltage of 2 kV. The magnification of the secondary electron image was adjusted to be identical to the magnification of the two-dimensional image obtained in the TOF-SIMS analysis. In the secondary electron image, the pore portion present in the section of the film was observed.

Next, a relative positional relationship between the dye portion and the pore portion was observed by superimposing the two-dimensional image obtained in the TOF-SIMS analysis and the secondary electron image obtained with the SEM on each other. As a result, the dye portion was positioned so as to overlap the pore portion. Thus, it was recognized that the sensitizing component and the light-emitting component were present at an interface between a matrix and the pore portion.

<Example 2>

An up-conversion film (thickness: 51 μm) was obtained in the same manner in Example 1 except that: a diketopyrrolopyrrole (DPP) derivative (the below-indicated chemical formula) was used as a light-emitting component instead of rubrene; and the amount (concentration) of the sensitizing component with respect to 1 g of the PVA was 4.92×10$^{-7}$ mol, and the amount (concentration) of the light-emitting component with respect thereto was set to 4.92×10$^{-5}$ mol (i.e., a molar ratio between the sensitizing component and the light-emitting component was set to 1:100). The resultant film was subjected to the same evaluations as those of Example 1. As a result, up-conversion emission having a peak wavelength of about 630 nm was observed. The resultant film had a surface density of 0.0045 g/cm$^2$ and a density of 0.8775 g/cm$^3$. The emission peak integrated value (from 500 nm to 730 nm) of the film was 4 times as large as that of the film of Comparative Example 1 to be described later.

<Light-emitting Component>

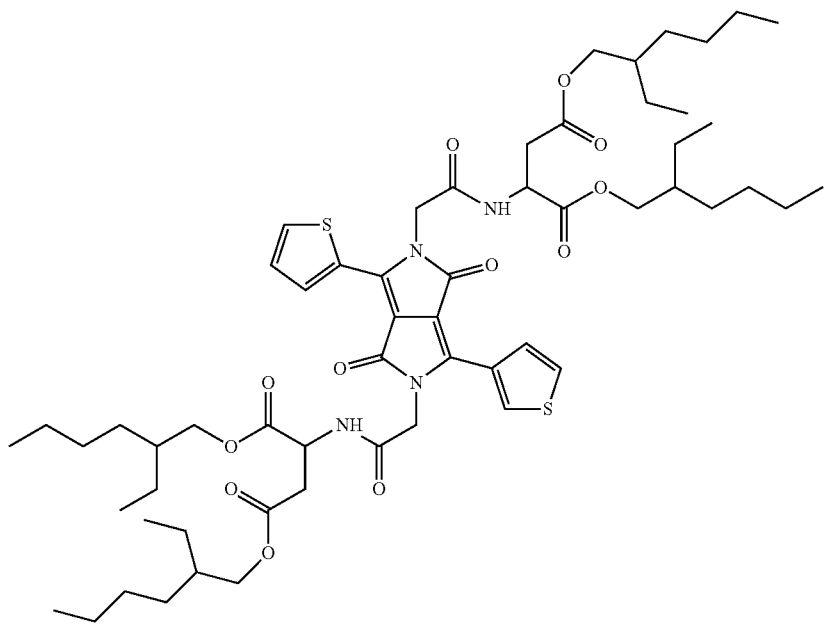 [SMILES: CCCCC(CC)COC(=O)CC(NC(=O)CN1C(=O)C2=C(c3cccs3)N(CC(=O)NC(CC(=O)OCC(CC)CCCC)C(=O)OCC(CC)CCCC)C(=O)C2=C1c1ccsc1)C(=O)OCC(CC)CCCC]

<Light-emitting Component>

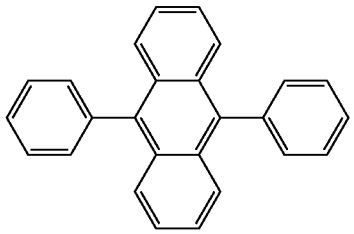

<Example 3>

Platinum octaethylporphyrin (PtOEP: the below-indicated chemical formula) was used as a sensitizing component, and diphenylanthracene (DPA: the below-indicated chemical formula) was used a light-emitting component. Further, the amount (concentration) of the sensitizing component with respect to 1 g of the PVA was set to $2.39 \times 10^{-7}$ mol, and the amount (concentration) of the light-emitting component with respect thereto was set to $4.78 \times 10^{-5}$ mol (i.e., a molar ratio between the sensitizing component and the light-emitting component was set to 1:200). A solution of the sensitizing component and the light-emitting component was prepared in air. An up-conversion film (thickness: 44 μm) was obtained in the same manner as in Example 1 except the foregoing.

<Sensitizing Component>

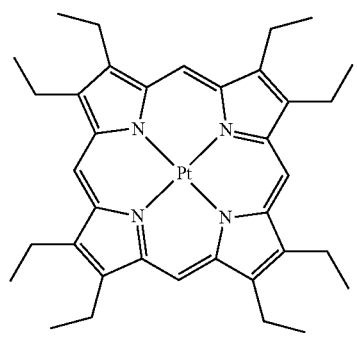

The resultant film was irradiated with laser light having a wavelength of 532 nm, an intensity of 174 mW/cm$^2$, and an irradiation diameter of 100 μm. An excited light density was adjusted with a ND filter, and was measured in the range of 150 W/cm$^2$ or less. Up-conversion emission was detected with a spectrometer through an optical fiber, and a detection range was set so that the entire laser diameter fell within the range. As a result, up-conversion emission having a peak wavelength of about 430 nm was observed. The resultant film had a surface density of 0.0050 g/cm$^2$ and a density of 1.1286 g/cm$^3$. The film had an average particle diameter of 0.6 μm and a porosity of 39%. The emission peak integrated value (from 400 nm to 510 nm) of the film was 11 times as large as that of the film of Comparative Example 2 to be described later.

In addition, the resultant film was subjected to the evaluation of a porous structure, and the evaluation of the position at which each of the sensitizing component and the light-emitting component was present in the same manner as in Example 1. A sectional SEM image of the film of Example 3 is shown in FIG. 4. In. FIG. 4, it can be recognized that the pore portion of the film has closed cells and an open-cell structure in which a plurality of cells are continuous with each other. More specifically, open cells having cavities communicating to the other air holes, and closed cells free of cavities communicating to the other air holes were observed.

<Example 4>

An up-conversion film was obtained in the same manner as in Example 3 except that palladium octaethylporphyrin (PdOEP: the below-indicated chemical formula) was used as a sensitizing component. The resultant film was subjected to the same evaluation as that of Example 3. As a result, up-conversion emission having a peak wavelength of about 430 nm was observed. The emission peak integrated value (from 400 nm to 510 nm) of the film was 5 times as large as that of the film of Comparative Example 5 to be described later.

<Sensitizing Component>

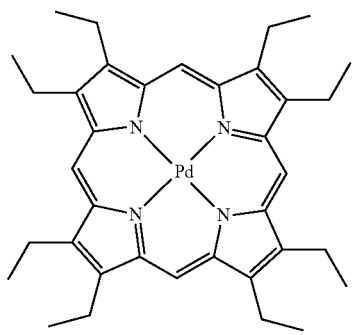

<Example 5>

An up-conversion film was obtained in the same manner as in Example 3 except that hydroxyethyl cellulose (HEC) was used instead of the PVA. SEM observation showed that the resultant film was a porous film having formed therein a pore portion based on a cell structure. The resultant film was subjected to the same evaluation as that of Example 3. As a result, up-conversion emission having a peak wavelength of about 430 nm was observed. The emission peak integrated value (from 400 nm to 510 nm) of the film was 19 times as large as that of the film of Comparative Example 2 to be described later.

<Example 6>

An up-conversion film was obtained in the same manner as in Example 1 except that the amount (concentration) of the sensitizing component with respect to 1 g of the PVA was set to $1.78 \times 10^{-8}$ mol, and the amount (concentration) of the light-emitting component with respect thereto was set to $1.78 \times 10^{-5}$ mol (i.e., a molar ratio between the sensitizing component and the light emitting component was set to 1:1,000). The resultant film was subjected to the same evaluations as those of Example 1. As a result, up-conversion emission having a peak wavelength of about 560 nm was observed. The emission leak integrated value (from 500 nm to 730 nm) of the film was 74 times as large as that of the film of Comparative Example 1 to be described later.

<Example 7>

An up-conversion film (thickness: 68 μm) was obtained in the same manner as in Example 1 except that the addition amount of the solution with respect to 1 g of the PVA (the concentration of the sensitizing component and the concentration of the light-emitting component were the same as those of Example 1) was set to 2.7 ml. The resultant film was subjected to the same evaluations as those of Example 1. As a result, up-conversion emission having a broad peak in the range of from about 570 nm to about 600 nm was observed. The resultant film had a surface density of 0.0033 g/cm² and a density of 0.4804 g/cm³. The film had an average particle diameter of 1.0 μm and a porosity of 42%. The emission peak integrated value (from 500 nm to 730 nm) of the film was 372 times as large as that of the film of Comparative Example 1 to be described later. In addition, a sectional SEM image of the film of Example 7 is shown in FIG. 5. Also in FIG. 5, as in FIG. 4, open cells having cavities communicating to the other air holes, and closed cells free of cavities communicating to the other air holes were observed.

<Comparative Example 1>

An up-conversion film (thickness: 28 μm) was obtained in the same manner as in Example 1 except that a solution of the sensitizing component and the light-emitting component was prepared by using tetrahydrofuran (THF: water-soluble solvent) instead of toluene. No emulsion was formed in the production process. SEM observation showed that no cell was observed in the resultant film. The resultant film was subjected to the same evaluations as those of Example 1. As a result, up-conversion emission having a peak wavelength of about 560 nm was observed. The resultant film had a surface density of 0.0035 g/cm² and a density of 1.2362 g/cm³.

<Comparative Example 2>

An up-conversion film (thickness: 27 μm) was obtained in the same manner as Example 3 except that a solution of the sensitizing component and the light-emitting component was prepared by using tetrahydrofuran (THF: water-soluble solvent) instead of toluene. No emulsion was formed in the production process. SEM observation showed that no cell was observed in the resultant film. The resultant film was subjected to the same evaluations as those of Example 1. As a result, up-conversion emission having a peak wavelength of about 440 nm was observed. The resultant film had a surface density of 0.0045 g/cm² and a density of 1.6404 g/cm³.

<Up-conversion of Light having Intensity as low as that of Sunlight>

The film of Example 1 was irradiated with xenon light having an intensity (2.5 mW/cm²) as low as that of sunlight. As a result, such up-conversion emission as shown in FIG. 3 was observed. Meanwhile, no up-conversion emission was observed in the film of Comparative Example 1.

<Example 8>

An up-conversion film was obtained in the same manner as in Example 3 except that a product having a polymerization degree of 1,800 and a saponification degree of from 83.0% to 86.0% was used as PVA. SEM observation showed that the resultant film was a porous film having formed therein a pore portion based on a cell structure. The resultant film was subjected to the same evaluation as that of Example 3. As a result, up-conversion emission having a peak wavelength of about 430 nm was observed. The emission peak integrated value (from 400 nm to 510 nm) of the film was 2.6 times as large as that of the film of Comparative Example 2.

<Example 9>

An up-conversion film was obtained in the same manner as in Example 3 except that a product having a polymerization degree of 500 and a saponification degree of from 98.0% to 99.0% was used as PVA. SEM observation showed that the resultant film was a porous film having formed therein a pore portion based on a cell structure. The resultant film was subjected to the same evaluations as those of Example 3. As a result, up-conversion emission having a peak wavelength of about 430 nm was observed. The emission peak integrated value (from 400 nm to 510 nm) of the film was 2.6 times as large as that of the film of Comparative Example 2. In addition, the resultant film had an average particle diameter of 0.3 µm and a porosity of 25%.

<Example 10>

An up-conversion film was obtained in the same manner as in Example 3 except that amine-modified ($NR_3^+Cl^-$) PVA (saponification degree: from 85.5% to 88.0%) was used as PVA. SEM observation showed that the resultant film was a porous film having formed therein a pore portion based on a cell structure. The resultant film was subjected to the same evaluation as that of Example 3. As a result, up-conversion emission having a peak wavelength of about 430 nm was observed. The emission peak integrated value (from 400 nm to 510 nm) of the film was 3.5 times as large as that of the film of Comparative Example 2.

<Example 11>

An up-conversion film was obtained in the: same manner as: in Example 3 except that carboxylic acid-modified (carboxyl group-introduced) PVA (saponification degree: 96.5% or more) was used as PVA. SEM observation showed that the resultant film was a porous film having formed therein a pore portion based on a cell structure. The resultant film was subjected to the same evaluation as that of Example 3. As a result, up-conversion emission having a peak wavelength of about 430 nm was observed. The emission peak integrated value (from 400 nm to 510 nm) of the film was 5.4 times as large as that of the film of Comparative Example 2.

<Example 12>

An up-conversion film was obtained in the same manner as in Example 3 except that poly(sodium 4-styrenesulfonate) (manufactured by Sigma-Aidrich Co. LLC, molecular weight: ~1,000,000) was used instead of the PVA. SEM observation showed that the resultant film was a porous film having formed therein a pore portion based on a cell structure. The resultant film was subjected to the same evaluations as those of Example 3. As a result, up-conversion emission having a peak wavelength of about 430 nm was observed. The emission peak integrated value (from 400 nm to 510 nm) of the film was 3.5 times as large as that of the film of Comparative Example 2. In addition, the resultant film had an average particle diameter of 0.6 µm and a porosity of 16%.

<Example 13>

An up-conversion film was obtained in the same manner as in Example 3 except that polyethylene oxide (manufactured by Wako Pure Chemical Industries, Ltd., molecular weight: 50,000) was used instead of the PVA. SEM observation showed that the resultant film was a porous film having formed therein a pore portion based on a cell structure. The resultant film was subjected to the same evaluation as that of Example 3. As a result, up-conversion emission having a peak wavelength of about 430 nm was observed. The emission peak integrated value (from 400 nm to 510 nm) of the film was 2.3 times as large as that of the film of Comparative Example 2.

<Example 14>

1. Preparation of Oily Solvent Solution of Sensitizing Component an Light-emitting Component A water-soluble TPP derivative (the below-indicated chemical formula) was used as a sensitizing component, and a water-soluble DPA derivative (the below-indicated chemical formula) was used as a light-emitting component. 296 Micrograms of the TPP derivative and 28.2 mg of the DPA derivative were loaded into a test tube, and 2.61 mL of a 1% solution of a nonionic surfactant (Span 80) in toluene was added to the mixture, followed by stirring with a homogenizer. Further, 1.05 mL of water was added to the mixture, and the whole was stirred with the homogenizer to prepare an emulsified liquid.

<Sensitizing Component>

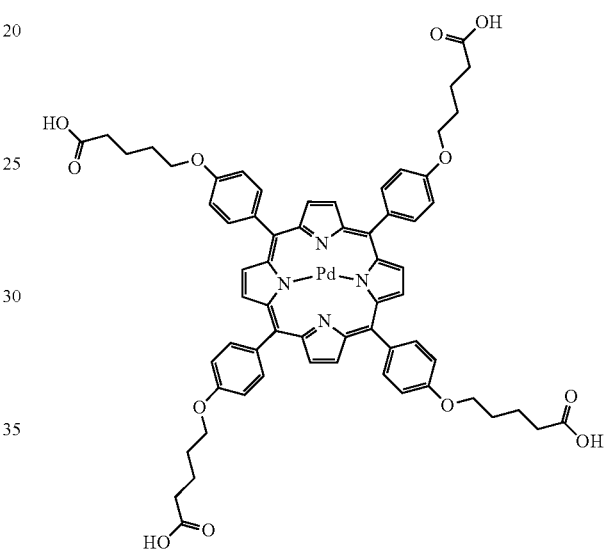

<Light-emitting Component>

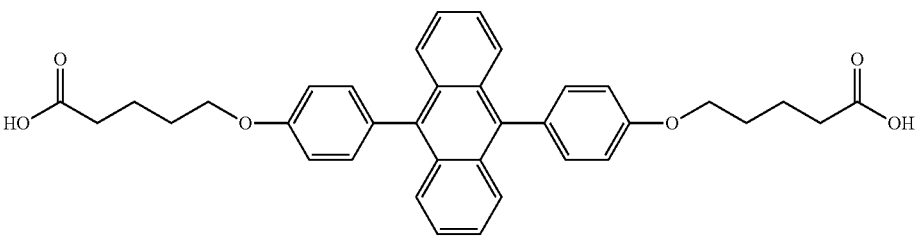 [SMILES: O=C(O)CCCCOc1ccc(-c2c3ccccc3c(-c3ccc(OCCCCC(=O)O)cc3)c3ccccc23)cc1]

2. Preparation of Emulsion

The total amount of the emulsified liquid obtained in the foregoing was added to a vial containing 5.23 g of a solution (20%) of polymethyl methacrylate (PMMA) in toluene, and the mixture was stirred with a homogenizer to prepare a W/O emulsion. The amount (concentration) of the sensitizing component with respect to 1 g of the PMMA was $2.39 \times 10^{-7}$ mol, and the amount (concentration) of the light-emitting component with respect thereto was $4.70 \times 10^{-5}$ mol. That is, a molar ratio between the sensitizing component and the light-emitting component was 1:200.

3. Formation of Up-conversion Film

The W/O emulsion obtained in the foregoing was drop-cast onto glass (substrate). The laminate of the coating film and the glass was dried while nitrogen was blown thereonto. Further, the dried laminate was dried in a vacuum in a desiccator. Finally, the dried coating film was peeled from the glass to provide an up-conversion film (thickness: 38 µm). SEM observation showed that the resultant film was a porous film having formed therein a pore portion based on a cell structure.

<Optical Evaluation>

The resultant film was loaded into a cell, and was sealed therein under an argon atmosphere to provide a measurement sample. The measurement sample was subjected to the same evaluation as that of Example 3. As a result, up-conversion emission having a peak wavelength of about 460 nm was observed. The emission peak integrated value (from 400 nm to 510 nm) of the film was 3.0 times as large as that of the film of Comparative Example 3 to be described later.

<Comparative Example 3>

An up-conversion film was obtained in the same manner as in Example 14 except that a suspension of the sensitizing Component and the light-emitting component was prepared without addition of water. No emulsion was formed in the production process. SEM observation showed that no cell was observed in the resultant film. The resultant film was subjected to the same evaluation as that of Example 14. As a result, up-conversion emission having a peak wavelength of about 460 nm was observed.

<Example 15>

An up-conversion film was obtained in the same manner as in Example 14 except that a solution (15%) of polystyrene (PS) in toluene was used instead of the solution (20%) of the PMMA in toluene. SEM observation showed that the resultant film was a porous film having formed therein a pore portion based on a cell structure. The resultant film was subjected to the same evaluation as that of Example 14. As a result, up-conversion emission having a peak wavelength of about 460 nm was observed. The emission peak integrated value (from 400 nm to 510 nm) of the film was 35.9 times large as that of the film of Comparative Example 4 to be described later.

<Comparative Example 4>

An up-conversion film was obtained in the same manner as in Example 15 except that a suspension of the sensitizing component and the light-emitting component was prepared without addition of water. No emulsion was formed in the production process. SEM observation showed that no cell was observed in the resultant film. The resultant film was subjected to the same evaluation as that of Example 14. As a result, up-conversion emission having peaks at about 460 nm and about 510 nm (maximum) was observed.

<Example 16>

An up-conversion film (thickness: 29 µm) was obtained in the same manner as in Example 1 except that the addition amount of the solution with respect to 1 g of the PVA (the concentration of the sensitizing component and the concentration of the light-emitting component were the same as those of Example 1) was set to 0.22 ml. The resultant film was subjected to the same evaluations as those of Example 1. As a result, up-conversion emission having a broad peak in the range of from about 570 nm to about 600 nm was observed. The resultant film had a surface density of 0.0043 g/cm$^2$ and a density of 1.4966 g/cm$^3$. The film had an average particle diameter of 1.0 µm and a porosity of 7%.

The emission peak integrated value (from 500 nm to 730 nm) of the film was 39 times as large as that of the film of Comparative Example 1.

<Comparative Example 5>

An up-conversion film was obtained in the same manner as in Example 4 except that a solution of the sensitizing component and the light-emitting component was prepared by using tetrahydrofuran (THF: water-soluble solvent) instead of toluene. No emulsion was formed in the production process. SEM observation showed that no cell was observed in the resultant film. The resultant film was subjected to the same evaluations as those of Example 1. As a result, up-conversion emission having a peak wavelength of about 440 nm was observed.

<Example 17>

An up-conversion film was obtained in the same manner as in Example 1 except that the concentration of PdTPTAP in the solution was set to 0.1 mM (i.e., a molar ratio between the sensitizing component and the light-emitting component was set to 1:200). The resultant film was subjected to the same evaluations as those of Example 1. As a result, up-conversion emission having a peak wavelength of about 560 nm was observed. The emission peak integrated value (from 500 nm to 730 nm) of the film was 616 times as large as that of the film of Comparative Example 1 described above.

<Example 18>

An up-conversion film was obtained in the same manner as in Example 1 except that platinum meso-tetraphenyl-tetraanthraporphyrin (PtTPTAP: the below-indicated chemical formula) was used as a sensitizing component. The resultant film was subjected to the same evaluations as those of Example 1. As a result, up-conversion emission having a peak wavelength of about 560 nm was observed. The emission peak integrated value (from 500 nm to 730 nm) of the film was 80 times as large as that of the film of Comparative Example 1 described above.

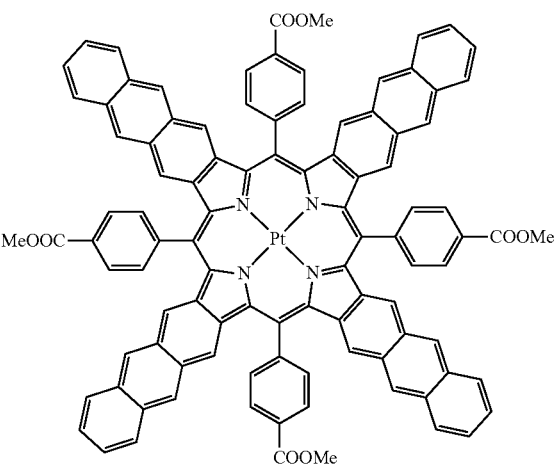

<Example 19>

An up-conversion film was obtained in the same manner as in Example 3 except that: a diphenylanthracene derivative (DPA2: the below-indicated chemical formula) was used as a light-emitting component; and the amount (concentration) of the sensitizing component with respect to 1 g of the PVA was set to 1.20×10$^{-6}$ mol, and the amount (concentration) of the light-emitting component with respect thereto was set to 2.39×10$^{-4}$ mol (i.e., a molar ratio between the sensitizing component and the light-emitting component was set to 1:200). The resultant film was subjected to the same evaluation as that of Example 3. The emission peak integrated value (from 400 nm to 510 nm) of the film was 9 times as large as that of the film of Comparative Example 3 described above.

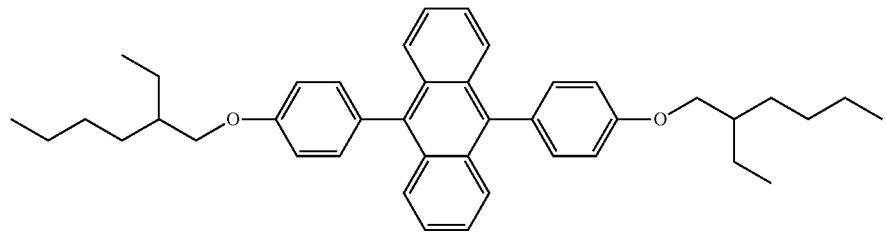 [SMILES: CCCCC(CC)COc1ccc(-c2c3ccccc3c(-c3ccc(OCC(CC)CCCC)cc3)c3ccccc23)cc1]

<Observation of Ultralow-temperature Up-conversion (UC) Emission>

The up-conversion film of each of Examples shown in Table 1 was immersed in liquid nitrogen for from 2 minutes to 3 minutes, and then the up-conversion film in the state of being immersed in liquid nitrogen was irradiated with laser light having a wavelength shown in Table 1. Laser light having a wavelength of 810 nm had an intensity 8,600 mW/cm$^2$ and an irradiation diameter of 1.2 mm, and laser light having a wavelength of 532 nm had an intensity of 135 mW/cm$^2$ and an irradiation diameter of 1.0 mm. The presence or absence of up-conversion emission was visually observed. As a result, up-conversion emission (ultralow-temperature UC emission) was observed in the up-conversion film of each of Examples. The presence or absence color of the ultralow-temperature UC emission are shown in Table 1.

<Observation of High-temperature Up-conversion (UC) Emission>

The up-conversion film of each of Examples shown in Table 1 was arranged on a cover glass, and was heated on a hot plate warmed to 180° C. for 1 minute. After that, the up-conversion film on the hot plate was irradiated with laser light having a wavelength shown in Table 1 (the same as that in the observation of ultralow-temperature UC emission). The presence or absence of up-conversion emission was visually observed. As a result, up-conversion emission (high-temperature UC emission) was observed in the up-conversion film of each of Examples. The presence or absence of the high-temperature UC emission is shown in Table 1. In other words, it was recognized that the up-conversion films of Examples were each capable of UC emission at each of high temperature (180° C.), normal temperature (25° C.), and ultralow temperature (-196° C.).

<Reference Example 1>

The presence or absence of UC emission in the solution of rubrene and PdTPTAP in toluene obtained in the section "1. Preparation of Oily Solvent Solution of Sensitizing Component and Light-emitting Component" in Example 1 was observed under each or normal temperature (25° C.) and ultralow temperature (-196° C.) in the same manner as that described above. In the solution of rubrene and PdTPTAP in toluene, UC emission was observed under normal temperature (25° C.), but no UC emission was observed under ultralow temperature (-196° C.) <Reference Example 2>

Palladium octaethylporphyrin (PdOEP) serving as a sensitizing component and diphenylanthracene (DPA) serving as a light-emitting component were dissolved in N,N-dimethylformamide (DMF: water-soluble solvent) so that a molar ratio between the sensitizing component and the light-emitting component became 1:200. Thus, a solution of PdOEP and DPA in DMF was prepared. The presence or absence of UC emission in the solution of PdOEP and DPA in DMF was observed under each of normal temperature (25° C.) and ultralow temperature (-196° C.) in the same manner as that described above. In the solution of PdOEP and DPA in DMF, UC emission was observed under normal temperature (25° C.), but no UC emission was observed under ultralow temperature (-196° C.).

TABLE 1

| No. | Applied laser light Wavelength [nm] | Ultralow-temperature UC emission Presence or absence | Color | High-temperature UC emission Presence of absence |
|---|---|---|---|---|
| Example 1 | 810 | ○ | Orange | ○ |
| Example 2 | 810 | ○ | Red | ○ |
| Example 3 | 532 | ○ | Blue | ○ |
| Example 4 | 532 | ○ | Blue | ○ |
| Example 6 | 810 | ○ | Orange | ○ |
| Example 7 | 810 | ○ | Orange | ○ |
| Example 16 | 810 | ○ | orange | ○ |
| Example 17 | 810 | ○ | Orange | ○ |
| Example 18 | 810 | ○ | orange | ○ |
| Reference Example 1 | 810 | x | | |
| Reference Example 2 | 532 | x | | |

Industrial Applicability

The photon up-conversion film according to the embodiment of the present invention may be suitably used in, for example, a solar cell or photovoltaic power generation, a photocatalyst, bioimaging, or an optical instrument.

The invention claimed is:
1. A photon up-conversion film, comprising:
a matrix including a resin; and
a pore portion,
wherein the photon up-conversion film comprises at least a sensitizing component capable of absorbing light in a first wavelength region λ1, and a light-emitting component capable of radiating light in a second wavelength region λ2 including wavelengths shorter than those of the first wavelength region λ1, and
wherein the sensitizing component and the light-emitting component are present at an interface between the matrix and the pore portion.
2. The photon up-conversion film according to claim 1, wherein the photon up-conversion film has a porosity of from 5.0 vol% to 60.0 vol%.

3. The photon up-conversion film according to claim 1, wherein the pore portion has closed cells and an open-cell structure in which a plurality of cells are continuous with each other.

4. The photon up-conversion film according to claim 1, wherein the resin is a water-soluble resin selected from a polystyrene sulfonic acid salt, polyethylene oxide, polyethyleneimine, a polyvinyl alcohol-based resin, and a cellulose-based resin.

5. The photon up-conversion film according to claim 1, wherein the resin is an oil-soluble resin selected from a (meth)acrylic resin and polystyrene.

6. The photon up-conversion film according to claim 1, wherein the photon up-conversion film comprises $7.00 \times 10^{-9}$ mol to $5.00 \times 10{-6}$ mol of the sensitizing component, and $5.00 \times 10^{-6}$ mol to $7.00 \times 10^{-5}$ mol of the light-emitting component with respect to 1 g, of the resin.

7. The photon up-conversion film according to claim 1, wherein the first wavelength region $\lambda 1$ ranges from 510 nm to 550 nm, the second wavelength region $\lambda 2$ ranges from 400 nm to 500 nm, the sensitizing component is any one of the below-indicated compounds, and the light-emitting component is any one of the below-indicated compounds.

<Sensitizing Component>

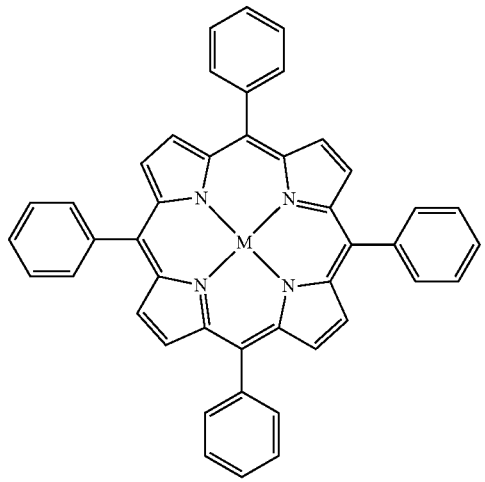

M = Pt, Pd

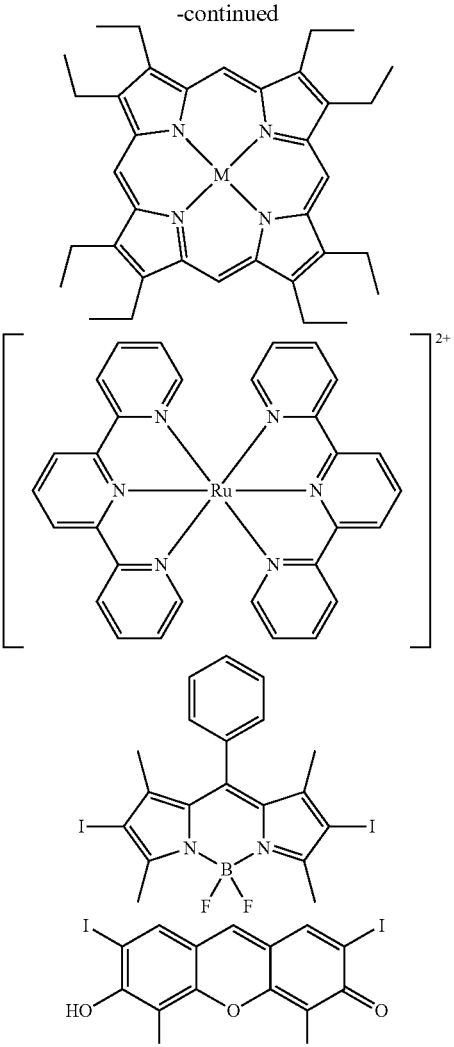

<Light-emitting Component>

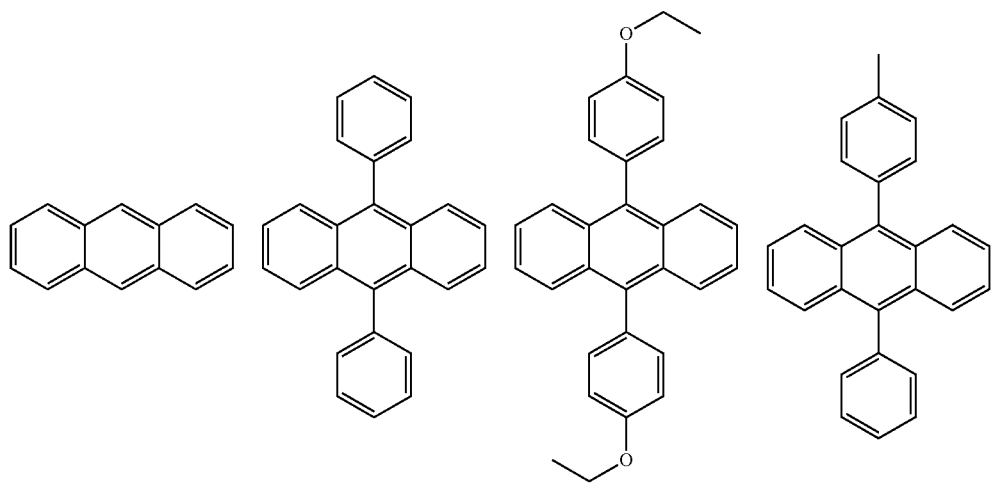

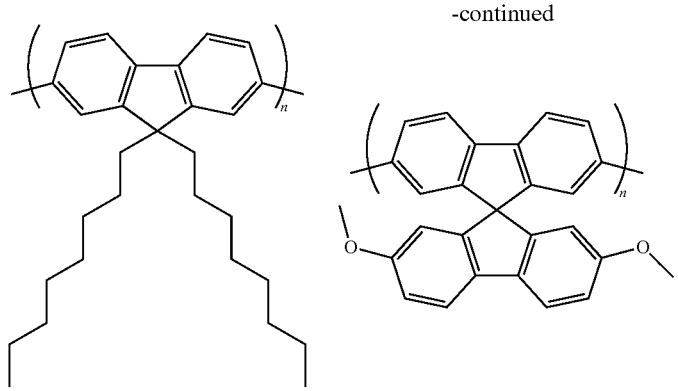
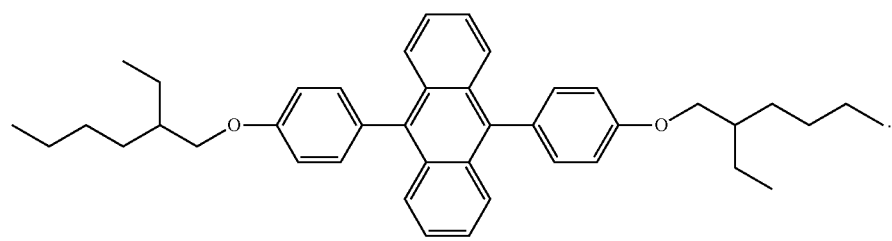
8. The photon up-conversion film according to claim 1, wherein the first wavelength region λ1 ranges from 610 nm to 650 nm, the second wavelength region λ2 ranges from 500 nm to 600 nm, the sensitizing component is any one of the below-indicated compounds, and the light-emitting component is any one of the below-indicated compounds.
<Sensitizing Component>
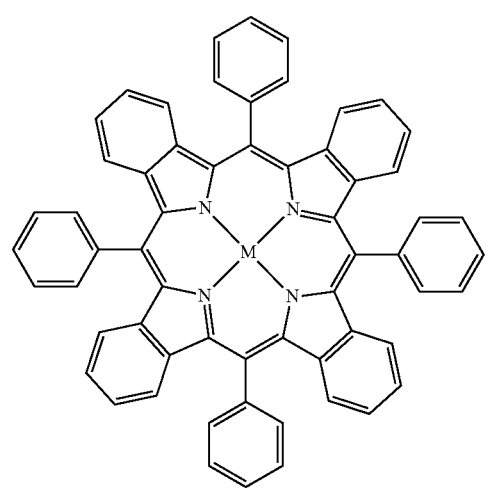
-continued
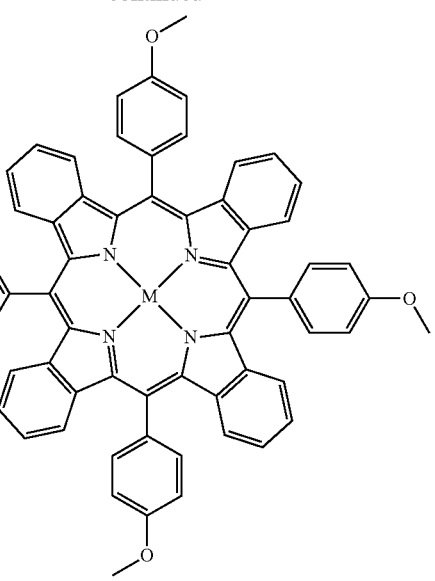

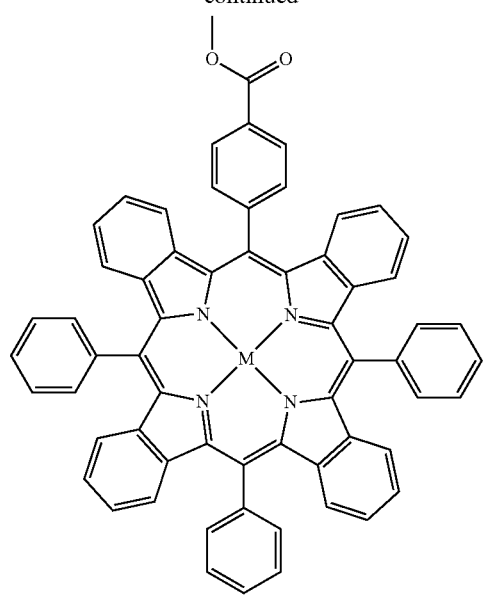

M = Pt, Pd

<Light-emitting Component>

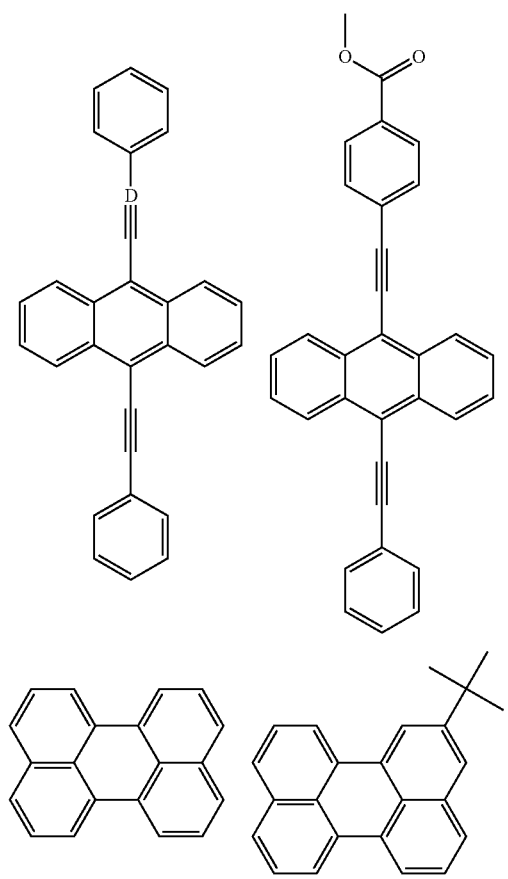

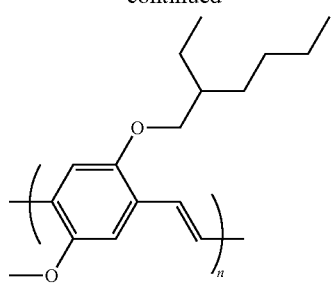

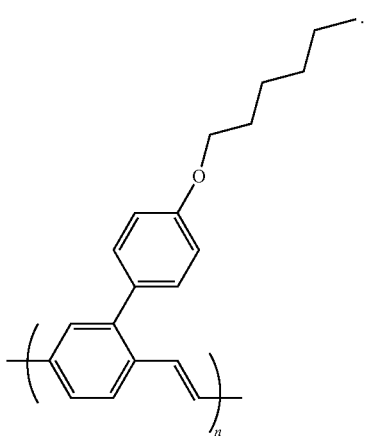

9. The photon up-conversion film according to claim 1, wherein the first wavelength region λ1 ranges from 700 nm to 810 nm, the second wavelength region λ2 ranges from 500 nm to 700 nm, the sensitizing component is any one of the below-indicated compounds, and the light-emitting component is any one of the below-indicated compounds.

<Sensitizing Component>

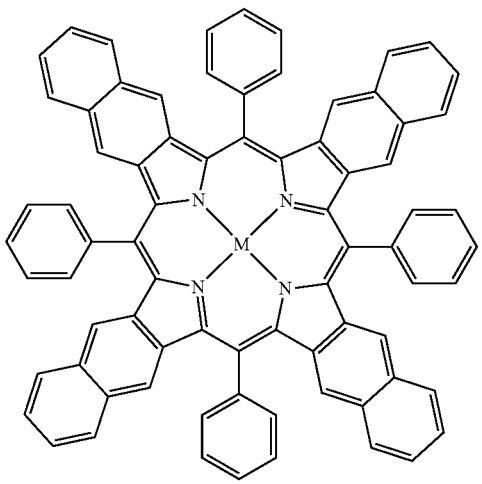

-continued
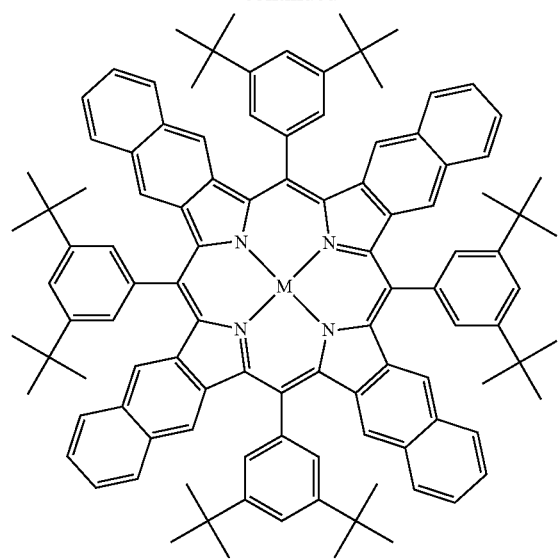
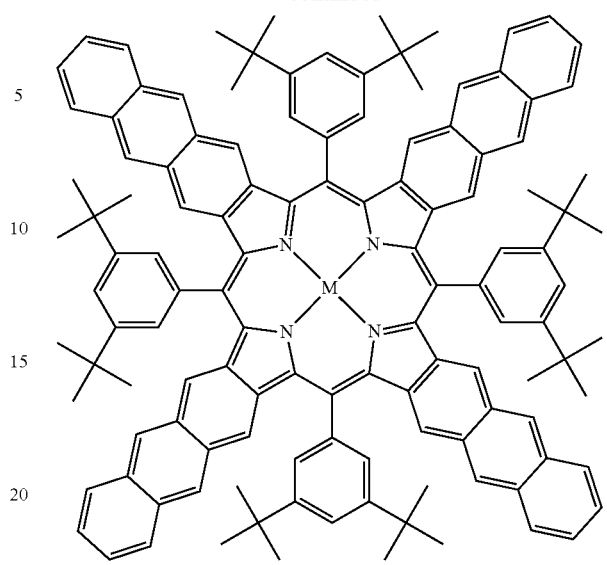
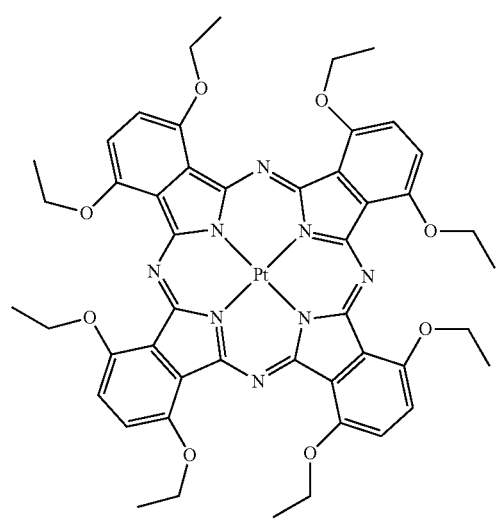
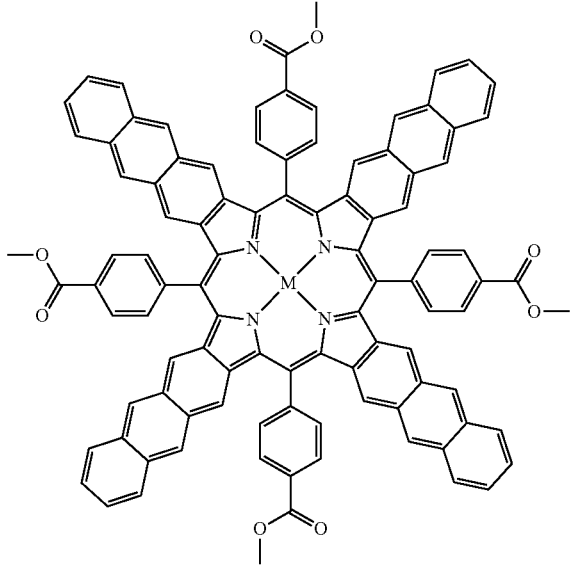
M = Pt, Pd

<Light-emitting Component>
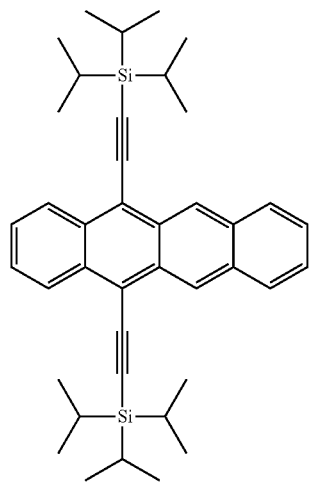
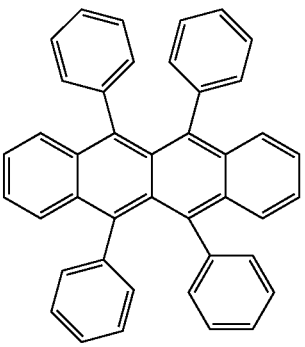
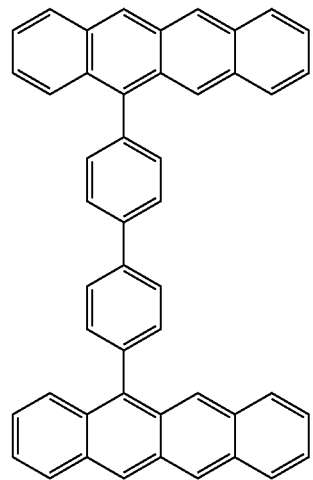
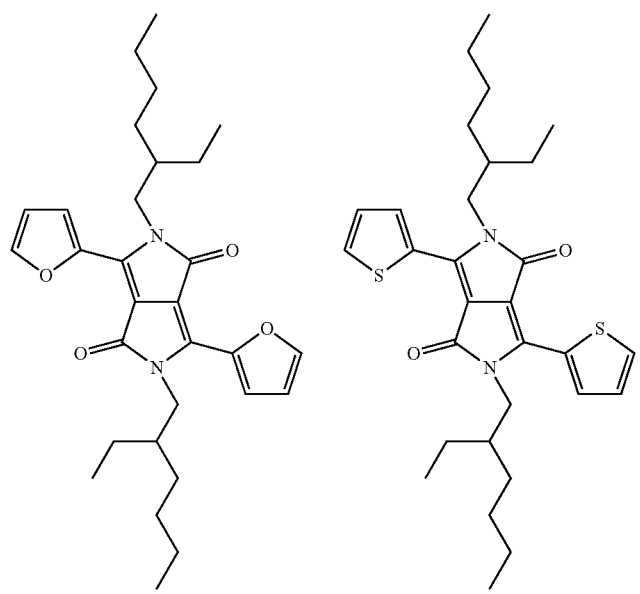

-continued
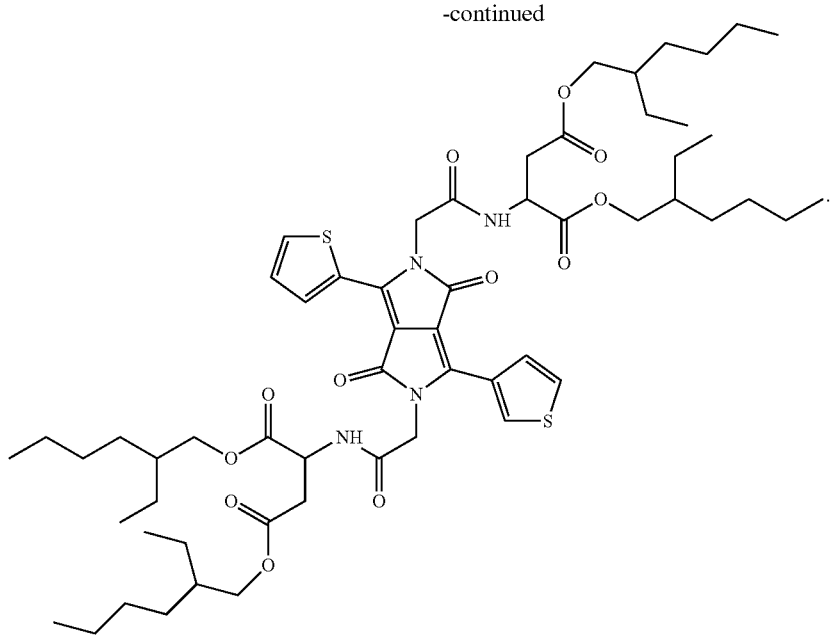
10. The photon up-conversion film according to claim 1, wherein the first wavelength region λ1 ranges from 700 nm to 730 nm, the second wavelength region λ2 ranges from 400 nm to 500 nm, the sensitizing component is any one of the below-indicated compounds, and the light-emitting component is any one of the below-indicated compounds.
<Sensitizing Component>
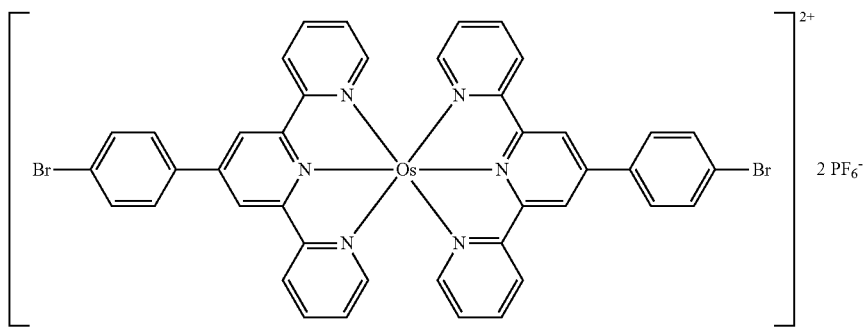
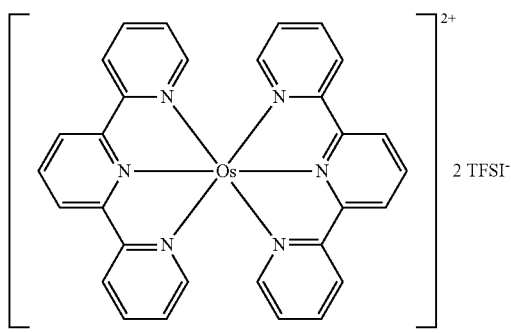

-continued

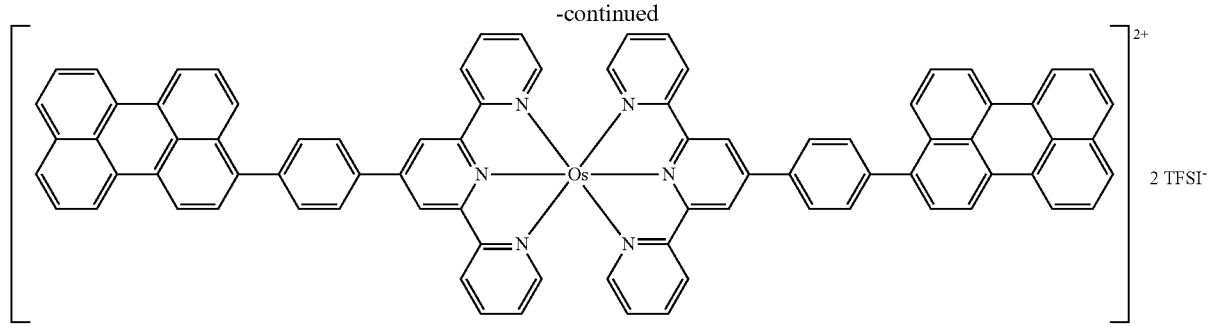

<Light-emitting Component>

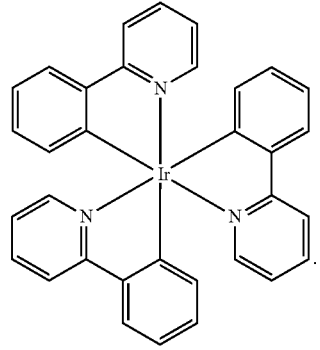

11. The photon up-conversion film according to claim 1, wherein the first wavelength region λ1 ranges from 410 nm to 500 nm, the second wavelength region λ2 ranges from 300 nm to 400 nm, the sensitizing component is any one of the below-indicated compounds, and the light-emitting component is any one of the below-indicated compounds.

<Sensitizing Component>

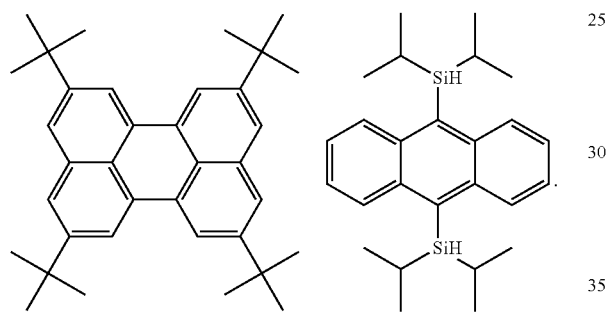

<Light-emitting Component>

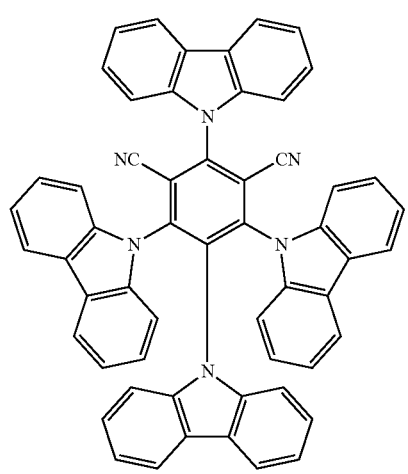

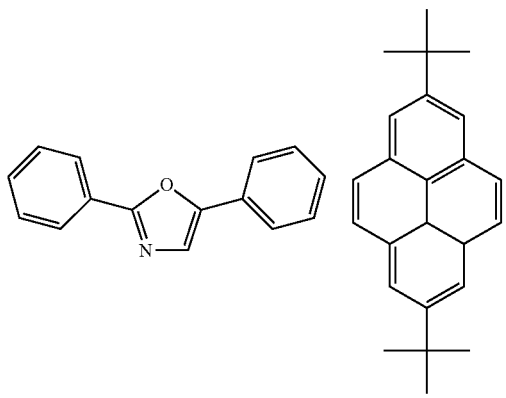

-continued

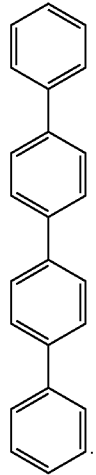

12. The photon up-conversion film according to claim 1, wherein the sensitizing component is a quantum dot, and the light-emitting component is any one of the below-indicated compounds.

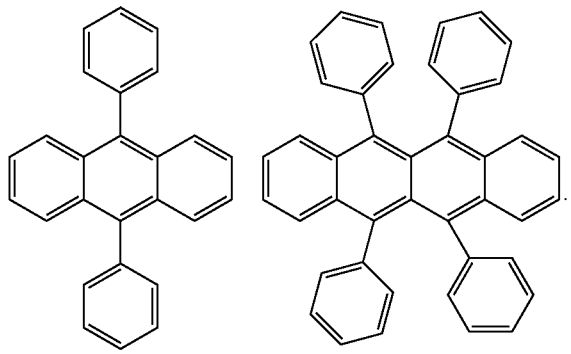

13. The photon up-conversion film according to claim 1, wherein the photon up-conversion film is capable of up-conversion emission in a temperature range of from −196° C. to 180° C.

14. A method of producing a photon up-conversion film, comprising:

preparing an oil-in-water emulsion from an aqueous solution of a water-soluble resin, and an oily solvent solution of a sensitizing component and a light-emitting component, or an oily solvent dispersion thereof;

applying the oil-in-water emulsion to a substrate to form a coating film;

drying the coating film; and applying an external force and/or heat to the dried coating film to form a film, which includes a matrix including the water-soluble resin and a pore portion, and in which the sensitizing component and the light-emitting component are present at an interface between the matrix and the pore portion.

15. A method of producing a photon up-conversion film, comprising:

preparing a water-in-oil emulsion from an oily solvent solution of an oil-soluble resin, and an aqueous solution of a sensitizing component and a light-emitting component, or an aqueous dispersion thereof;

applying the water-in-oil emulsion to a substrate to form a coating film;

drying the coating film; and forming, through the drying, a film, which includes a matrix including the oil-soluble resin and a pore portion, and in which the sensitizing component and the light-emitting component are present at an interface between the matrix and the pore portion.

* * * * *

UNITED STATES PATENT AND TRADEMARK OFFICE
CERTIFICATE OF CORRECTION

PATENT NO. : 11,959,000 B2  
APPLICATION NO. : 18/018177  
DATED : April 16, 2024  
INVENTOR(S) : Takeshi Mori et al.

Page 1 of 4

It is certified that error appears in the above-identified patent and that said Letters Patent is hereby corrected as shown below:

In the Specification

Column 6, Line 41:

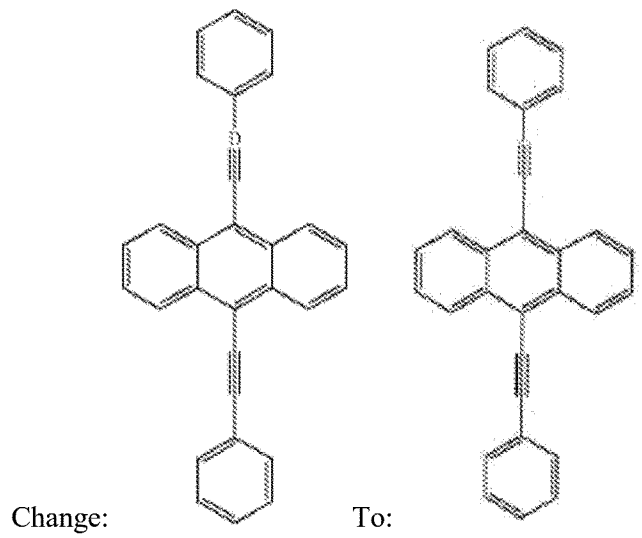

Change:          To:

Signed and Sealed this  
Twentieth Day of August, 2024

Katherine Kelly Vidal  
*Director of the United States Patent and Trademark Office*

CERTIFICATE OF CORRECTION (continued)
U.S. Pat. No. 11,959,000 B2

Column 27, Line 30:

Change: 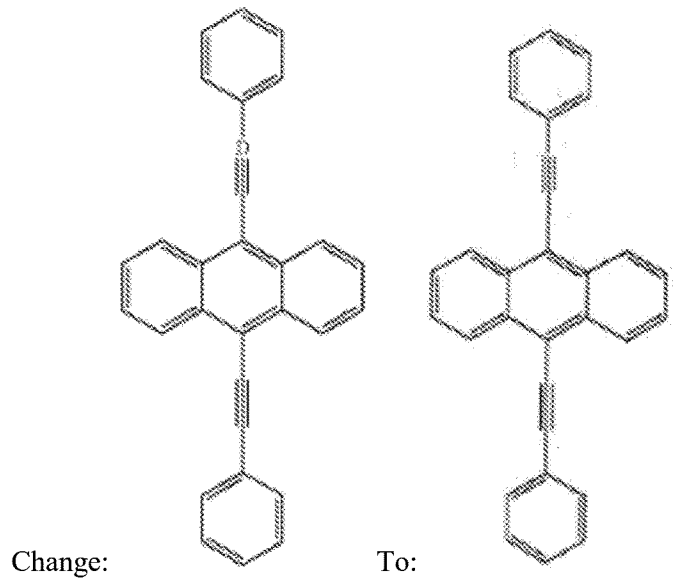 To:

Column 29, Line 23:

Change: 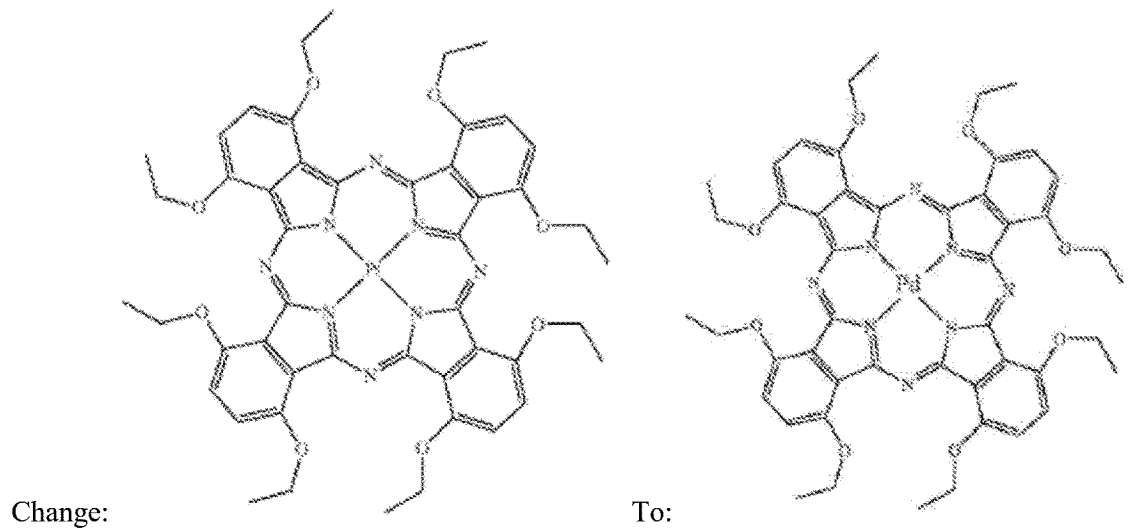 To:

CERTIFICATE OF CORRECTION (continued)
U.S. Pat. No. 11,959,000 B2

Column 42, Line 2:

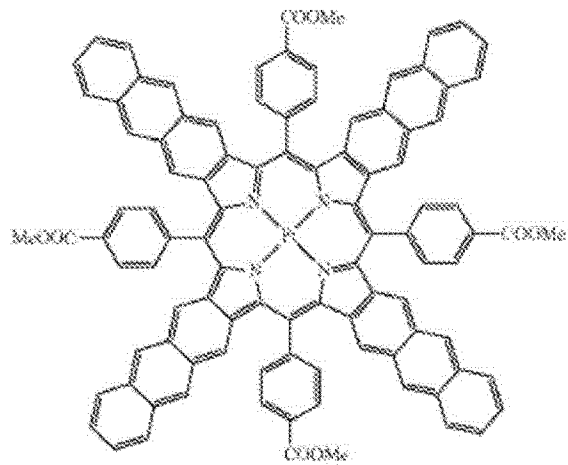

Change:

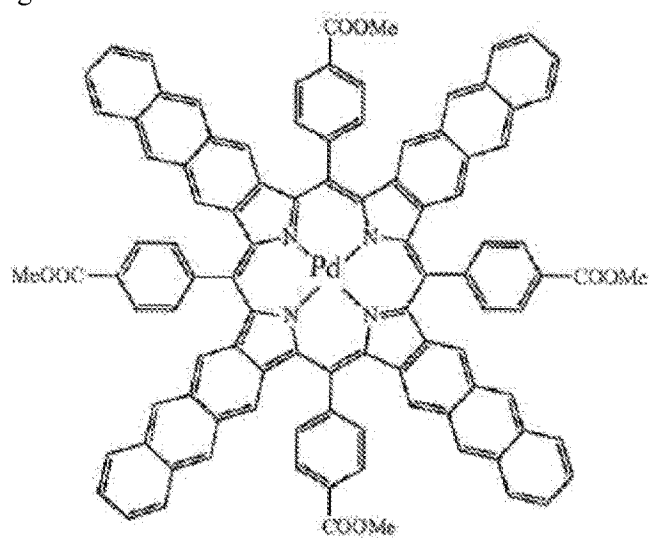

To:

In the Claims

Column 55, Line 15, Claim 6:
Change: 5.00×10-6 mol To: $5.00 \times 10^{-6}$ mol

CERTIFICATE OF CORRECTION (continued)
U.S. Pat. No. 11,959,000 B2

Column 59, Line 30, Claim 8:

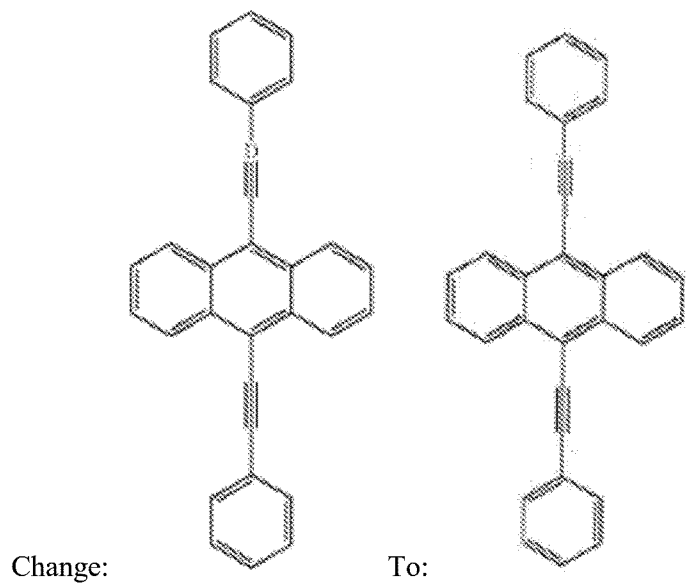

Change:          To:

Column 61, Line 23, Claim 9:

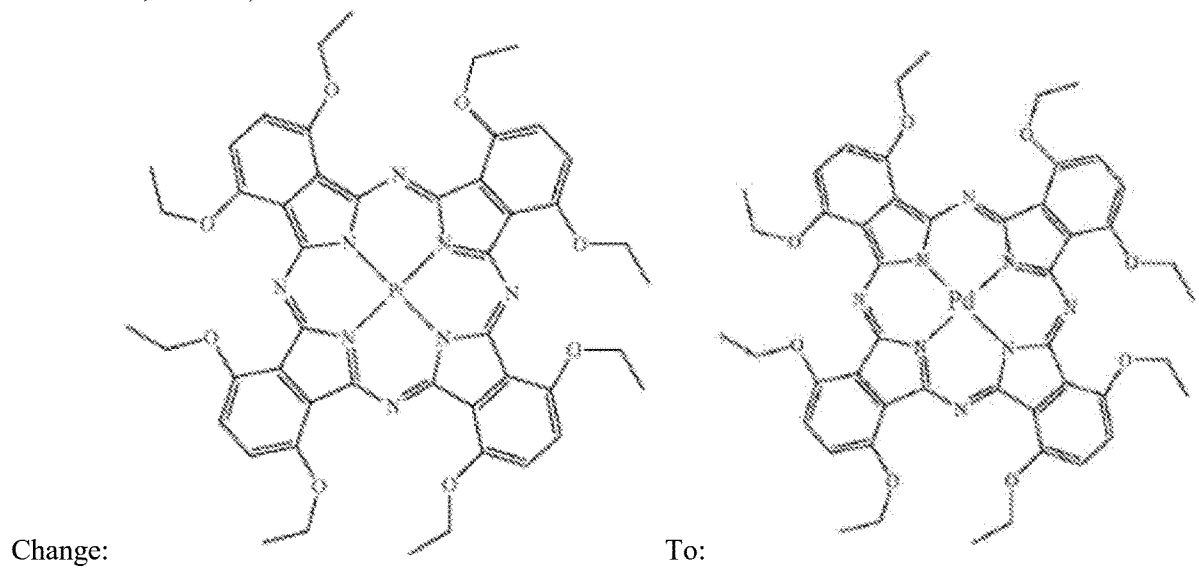

Change:          To: